United States Patent
Ji et al.

(10) Patent No.: US 8,630,275 B2
(45) Date of Patent: Jan. 14, 2014

(54) APPARATUS, METHOD, AND MEDIUM FOR SELF-ORGANIZING MULTI-HOP WIRELESS ACCESS NETWORKS

(75) Inventors: Lusheng Ji, Randolph, NJ (US); Brian Feldman, Gaithersburg, MD (US); Jonathan Russell Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/929,662

(22) Filed: Feb. 7, 2011

(65) Prior Publication Data

US 2011/0200026 A1 Aug. 18, 2011

Related U.S. Application Data

(63) Continuation of application No. 10/929,772, filed on Aug. 31, 2004.

(60) Provisional application No. 60/507,934, filed on Oct. 3, 2003, provisional application No. 60/428,700, filed on Nov. 25, 2002.

(51) Int. Cl.
*H04W 4/00* (2009.01)
(52) U.S. Cl.
USPC .......................... 370/338; 370/310; 370/328
(58) Field of Classification Search
USPC .......................................... 370/310, 328, 338
See application file for complete search history.

(56) References Cited

U.S. PATENT DOCUMENTS

| | | | |
|---|---|---|---|
| 5,768,381 A | 6/1998 | Hawthorne | |
| 5,822,309 A | 10/1998 | Ayanoglu et al. | 370/315 |
| 6,185,612 B1 * | 2/2001 | Jensen et al. | 709/223 |
| 6,453,159 B1 | 9/2002 | Lewis | |
| 6,850,503 B2 | 2/2005 | Dorenbosch et al. | |
| 6,879,574 B2 | 4/2005 | Naghian et al. | |
| 6,925,069 B2 | 8/2005 | Koos, Jr. et al. | |
| 6,947,768 B2 | 9/2005 | Adachi et al. | |
| 7,155,518 B2 | 12/2006 | Forslow | |
| 7,177,646 B2 | 2/2007 | O'Neill et al. | |
| 7,181,214 B1 | 2/2007 | White | |
| 7,206,294 B2 | 4/2007 | Garahi et al. | |
| 7,496,344 B2 | 2/2009 | Stadelmann et al. | |
| 7,664,119 B2 | 2/2010 | Adams et al. | |
| 2001/0033556 A1 | 10/2001 | Krishnamurthy et al. | |
| 2002/0031086 A1 | 3/2002 | Welin | |
| 2002/0138440 A1 | 9/2002 | Vaidyanathan et al. | |

(Continued)

OTHER PUBLICATIONS

U.S. Appl. No. 10/929,772, filed Aug. 31, 2004, Lusheng Ji et al., Fujitsu limited.

(Continued)

*Primary Examiner* — Wayne Cai
*Assistant Examiner* — Matthew Genack
(74) *Attorney, Agent, or Firm* — Staas & Halsey LLP

(57) ABSTRACT

A wireless computer network includes a backbone network including backbone network nodes authenticated to each other and in communication with each other. The wireless computer network also includes a master authenticator node and a proxy authenticator node among the backbone network nodes. When an unauthenticated new node requests authentication to the backbone network and the unauthenticated new node is in communication with at least one of the backbone network nodes, the at least one of the backbone network nodes becoming the proxy authenticator node for the unauthenticated new node and communicates with the master authenticator node to authenticate the unauthenticated new node to the backbone network.

10 Claims, 12 Drawing Sheets

(56) References Cited

U.S. PATENT DOCUMENTS

| | | | |
|---|---|---|---|
| 2002/0143855 A1 | 10/2002 | Traversat et al. | |
| 2002/0151300 A1 | 10/2002 | Suda et al. | |
| 2002/0183038 A1 | 12/2002 | Comstock et al. | |
| 2003/0016678 A1 | 1/2003 | Maeno | |
| 2003/0126262 A1 | 7/2003 | Yoshida et al. | |
| 2004/0005878 A1 | 1/2004 | Olin et al. | 455/414.1 |
| 2004/0064693 A1* | 4/2004 | Pabla et al. | 713/168 |
| 2004/0078480 A1 | 4/2004 | Boucher et al. | |
| 2004/0139201 A1 | 7/2004 | Chaudhary et al. | |
| 2004/0203698 A1 | 10/2004 | Comp | |
| 2004/0252715 A1 | 12/2004 | Noda | |
| 2006/0052085 A1 | 3/2006 | Gregrio Rodriguez et al. | |
| 2006/0117113 A1 | 6/2006 | Elliott et al. | |

OTHER PUBLICATIONS

U.S. Appl. No. 12/976,796, filed Dec. 22, 2010, Lusheng Ji et al., Fujitsu limited.
Chinese Office Action dated Feb. 6, 2012 issued in copending Chinese Patent Application No. 201010145184.2.
Office Action dated May 11, 2012, issued in copending U.S. Appl. No. 10/929,772.
Office Action dated Jan. 24, 2013, issued in copending U.S. Appl. No. 10/929,772.
Office Action dated Apr. 18, 2013, issued in copending U.S. Appl. No. 12/976,796.
Office Action dated Oct. 13, 2011, issued in copending U.S. Appl. No. 10/929,772.
Office Action dated Feb. 5, 2009 for corresponding U.S. Appl. No. 10/929,772.
Office Action dated Apr. 15, 2008 for corresponding U.S. Appl. No. 10/929,772.
Office Action dated Oct. 10, 2007 for corresponding U.S. Appl. No. 10/463,857.
Office Action dated Apr. 21, 2008 for corresponding U.S. Appl. No. 10/463,857.
Office Action dated Aug. 29, 2008 for corresponding U.S. Appl. No. 10/463,857.
Office Action dated Oct. 9, 2008 for corresponding U.S. Appl. No. 10/463,857.
Office Action dated Apr. 8, 2009 for corresponding U.S. Appl. No. 10/463,857.
Office Action dated Sep. 17, 2009 for corresponding U.S. Appl. No. 10/463,857.
Office Action dated Oct. 19, 2009 for corresponding U.S. Appl. No. 10/463,857.
Chinese Office Action dated Sep. 4, 2009 in corresponding Chinese Patent Application No. 200310115416.X.
Thierry Ernst, "Network Mobility Support Terminology draft-ernst-monet-terminology-01.txt", Jul. 31, 2002, pp. 4-10.
Office Action dated Oct. 7, 2009, issued in copending U.S. Appl. No. 10/929,772.
Office Action dated Aug. 31, 2010, Issued in copending U.S. Appl. No. 10/929,772.
Office Action dated Mar. 16, 2010, issued in copending U.S. Appl. No. 10/929,772.
Office Action dated Sep. 29, 2010, issued in copending U.S. Appl. No. 12/053,414.
Office Action dated Jun. 26, 2009, issued in copending U.S. Appl. No. 12/053,414.
Office Action dated Oct. 26, 2009, issued in copending U.S. Appl. No. 12/053,414.
Office Action issued in co-pending U.S. Appl. No. 10/929,772, dated Mar. 7, 2011.
Advisory Action dated Aug. 8, 2011, issued in copending U.S. Appl. No. 10/929,772.

* cited by examiner

| Bridge | Local Interface | Neighbor Interface | Destination Addresses |
|--------|----------------|--------------------|-----------------------|
| B1 | AP1 | Null | C1, AP1 |
|    | B1  | B3   | C2,C3,C4,C5, B2,AP2,B3,AP3 |
|    |     | Null | B1 |
| B2 | AP2 | Null | C2,C3,AP2 |
|    | B2  | B3   | C1,C4,C5,B1,AP1,B3,AP3 |
|    |     | Null | B2 |
| B3 | AP3 | Null | C4,C5 |
|    | B3  | B1   | C1,B1,AP1 |
|    |     | B2   | C2,C3,B2,AP2 |
|    |     | Null | B3 |

| To DS | From DS | Address 1 | Address 2 | Address 3 | Address 4 |
|---|---|---|---|---|---|
| 0 | 0 | Destination | Source | BSSID | N/A |
| 0 | 1 | Destination | BSSID | Source | N/A |
| 1 | 0 | BSSID | Source | Destination | N/A |
| 1 | 1 | Receiver | Transmitter | Destination | Source |

FIGURE 8

| Router | Destination | Next Hop | Local Interface | Distance |
|---|---|---|---|---|
| B1 | B1 | NULL | B1 | 0 |
| | B2 | B2 | B1 | 1 |
| | B3 | B3 | B1 | 1 |
| | C5 | B3 | B1 | 2 |
| | AP1's subnet | NULL | AP1 | 0 |
| | AP2's subnet | B2 | B1 | 2 |
| | AP3's subnet | B3 | B1 | 2 |
| B2 | B1 | B1 | B2 | 1 |
| | B2 | NULL | B2 | 0 |
| | B3 | B3 | B2 | 1 |
| | C5 | B3 | B2 | 2 |
| | AP1's subnet | B1 | B2 | 2 |
| | AP2's subnet | NULL | AP2 | 0 |
| | AP3's subnet | B3 | B2 | 2 |
| B3 | B1 | B1 | B3 | 1 |
| | B2 | B2 | B3 | 1 |
| | B3 | NULL | B3 | 0 |
| | C5 | NULL | AP2 | 0 |
| | AP1's subnet | B1 | B3 | 2 |
| | AP2's subnet | B2 | B3 | 2 |
| | AP3's subnet | NULL | AP3 | 0 |

FIGURE 9

Routing Table 500

| Client MAC address | Client IP address | Previous AP IP address | Current AP IP address | Client Certificate |
|---|---|---|---|---|

FIGURE 10

Contents of the Routing Update message 600

APPARATUS, METHOD, AND MEDIUM FOR SELF-ORGANIZING MULTI-HOP WIRELESS ACCESS NETWORKS

CROSS-REFERENCE TO RELATED APPLICATION

This application is a U.S. continuation application of U.S. Ser. No. 10/929,772 filed Aug. 31, 2004 which is also related to and claims the benefit of priority from to U.S. Provisional Patent Application Ser. No. 60/507,934, filed Oct. 3, 2003, U.S. Provisional Patent Application Ser. No. 60/428,700, filed Nov. 25, 2002, U.S. patent application Ser. No. 10/463,857, filed Jun. 18, 2003, now issued, in the United States Patent and Trademark Office, the disclosures of each is incorporated herein by reference.

BACKGROUND

1. Field of the Invention

The present invention is related to using multi-hop wireless networks to provide network access services, and, to a particular security scheme for a multi-hop wireless access network.

2. Description of the Related Art

The IEEE 802.11 standard ("Part 11: Wireless LAN Medium Access Control (MAC) and physical layer specifications", IEEE, 1999, and including all variations) is known in the art. In the current 802.11 WLAN architecture, mobile clients connect wirelessly to Access Points (APs) to acquire connectivity to a backbone network to which the APs are attached. The backbone network is typically wired and is then connected to the rest of the organizational network.

The WLAN architecture is ideal for network administrators who wish to wirelessly extend the boundary of their existing wired campus or corporate networks and to provide campus-wide mobility support. Under this architecture, mobile clients are no longer constrained by network cables and wall jacks as long as they maintain direct wireless contacts with some AR. Due to a number of dynamic configuration protocols such as the DHCP, mobile clients can easily join the WLAN with little or no user configuration effort. A user can move freely within the coverage area of the APs. When the user moves across the boundaries of the service areas of APs, WLAN and bridge protocols can update the link layer connectivity for the user so that on going communication sessions are not interrupted by the handoff and actual communication carrier (radio frequency) switch.

While mobile clients can enjoy the convenience of wireless network connectivity, on the other hand, it is not a trivial task to deploy a WLAN. APs need to be interconnected via a backbone network, typically a wired LAN. Therefore network cables must be installed to connect the APs to the existing network infrastructure. Electrical wires must also be in place to supply operating power to the APs. In addition, in order to determine the locations for the APs, WLAN planners need to predict wireless usage and conduct site surveys to determine the radio propagation characteristics. Operating channels also need to be allocated to each AP to keep the interference between neighboring communication cells to a minimum. After the deployment, it becomes another costly task to change the placement of the APs since the cables and wires need to be changed as well. If the usage pattern changes, oftentimes the WLAN is not able to be dynamically reconfigured to adapt to the changes.

Another problem with the existing IEEE 802.11 WLAN lies in its current security mechanism. In a WLAN, all transmitted bits are delivered over the air, which is an open communication medium to which anyone has access if he/she is within the radio signal range and has a radio device capable of receiving WLAN radio signals. Thus, encryption must be applied to sensitive data so that only the intended recipients can reconstruct and comprehend the data.

The IEEE 802.11 standard relies on the Wired Equivalency Privacy (WEP) protocol for its data protection. WEP uses a shared secret key of 40 bits (or 104 bits in a later version). A 24 bit Initial Vector (IV) is concatenated with the shared key to create a 64 bit (or 128 bit in the later standard) seed. The seed is then fed to a RC4 Pseudo Random Number Generator (PRNG) to generate a random bit sequence, which is used as the frame encryption key stream. The IV may be changed for every data frame encrypted so that the seed for the RC4 PRNG is different for every data frame. Thus, a different key stream is generated for encrypting each data frame. The IV is enclosed as clear text in each data frame so that the receiver may concatenate the received IV with the shared secret key to produce the RC4 PRNG seed and compute the decryption key stream. However, due to the limited IV size, there are only $2^{24}$, about 16 million, distinct key streams. Given the size of an average data frame and the transmission rate supported by IEEE 802.11, a busy AP may exhaust the distinct key stream space very quickly and be forced to reuse the encryption key stream. Since the IVs are enclosed as clear text in each data frame, it is relatively easy for an attacker to recognize a reused key stream. The attacker may collect pieces of cipher text that are encrypted with the same key stream and perform statistical analysis to attack and recover the plaintext. An attacker may also build up a dictionary of all possible key streams. In addition to vulnerabilities to these types of attacks, the security research community has also identified other weaknesses of the WEP protocol (N. Borisov, I. Goldberg, and D. Wagner, "Intercepting Mobile Communications: The Insecurity of 802.11", MOBICOM 2001, 2001).

The authentication scheme of IEEE 802.11 also has known problems that are related to the weaknesses in its encryption scheme. IEEE 802.11 APs provide two methods to protect against unauthorized accesses: Medium Access Control (MAC) address filtering and WEP-based shared-key authentication. A MAC address filter simply drops all data frames whose destination or source addresses are not listed in a pre-defined "allowed list". However, because MAC addresses can easily be sniffed and forged by any attacker, the MAC address filter offers little protection against unauthorized network accesses. The shared-key authentication process involves both parties (named initiator and responder) encrypting the same challenge using WEP with the same shared-key but different IVs. Since the shared-key authentication algorithm authorizes network access to those who have the shared-key, it would be effective only if unauthorized parties cannot recover the shared-key. However, with WEP being breakable, the shared-key authentication becomes only an illusion.

Also known in the art is the IEEE's 802.11i (802.11i, IEEE 802.11 Task Group I, work in progress) standard, which is developed to replace the current WEP based security mechanism of the 802.11 WLAN. The IEEE's 802.1x (Port Based Network Access Control) standard ("Port-Based Network Access Control", IEEE, 2001), which is used as a component of 802.11i, specifies an architectural framework that is designed to provide user authentication, network access control, and dynamic key management. Within the IEEE 802.1x framework, a system can use various specific authentication schemes and algorithms. The actual algorithm that is used to determine whether a user is authentic is left open and multiple algorithms are possible. One known popular algorithm is the Remote Authentication Dial In User Service (RADIUS) (IETF RFC 2965, June 2000).

In addition, the Extensible Authentication Protocol over LAN (EAPOL) and other variations of the Extensible Authentication Protocol (EAP), L. Blunk and J. Vollbrecht, "PPP Extensible Authentication Protocol (EAP)", IETF RFC 2284, March, 1998) are known in the art due to their roles in the IEEE 802.1x and 802.11i protocols. EAP is built around the challenge-response communication paradigm that is common in network security solutions. Although originally designed as an authentication method for PPP connection, it can also be used for a wide range of LAN types such as Ethernet, token ring, or WLANs.

The IEEE 802.1x protocol is briefly explained. The IEEE 802.1x is a port-based, access control framework for wired or wireless networks that decides whether a client is authorized to use the network access service and then implements the decision. There are three types of entities in the IEEE 802.1x framework: supplicants, authenticators, and an authentication server. A supplicant is a client who wishes to use the network access service. An authenticator is a device which separates the supplicant from the rest of the network, i.e. an AP, and prevents unauthorized access. The authentication server is a backend server which makes the decision of granting or denying the supplicant's request. After the decision, the authenticator either blocks the supplicant's data traffic or lets it pass through.

IEEE 802.1x messages are transmitted using two versions of the EAP over two types of connections: 1) the link layer (LAN or WLAN) connections between the authenticators and supplicants and 2) the transport layer connections between the authenticators and the authentication server. For the first type of connection, IEEE 802.1x defines the Extensible Authentication Protocol over LAN (EAPOL). For the second type of connections, although the IEEE 802.1x does not define its own protocol, installations have been using a protocol based on the specifications defined by the "EAP over RADIUS" standard (C. Rigney, W. Willats, and P. Calhoun, "RADIUS Extensions", IETF RFC2869, 2000). The Remote Access Dial-In User Services itself is defined in (C. Rigney, W. Willens, A. Rubens, and W. Simpson, "Remote Authentication Dial In User Service (RADIUS)", IETF RFC2865, 2000).

A typical IEEE 802.1x authentication session starts when the client (supplicant) sends an EAPOL-Start message to an access point (authenticator) indicating its interest in using network access service. Upon receiving this message, the authenticator sends back an EAP-Request/Identity message. The supplicant must respond with an EAP-Response/Identity message. After receiving the supplicant's identity, the authenticator then needs to contact the authentication server by forwarding the supplicant's identity response to it. From this point on, the authentication message exchanges are between the supplicant and the authentication server. The details of the message exchanges depend on the actual authentication (referred to as Upper Layer Authentication or ULA) algorithm being used. The IEEE 802.1x supports a number of such ULA mechanisms such as the Transport Layer Security (TLS) (T. Dierks, and C. Allen, "The TLS Protocol Version 1.0", IETF RFC2246, 1999) and the Kerberos V5 (J. Kohl, and C. Neuman, "The Kerberos Network Authentication Service (V5)", IETF RFC1510, 1993). Although all ULA messages pass through the authenticator, the authenticator needs not understand any of them. At the end of the authentication sequence, the authentication server makes a decision of either granting or denying the supplicant's access request. The decision is sent to the supplicant in an EAP-Success or EAP-Failure message. When the authenticator is forwarding this final Success/Failure message to the supplicant, it too understands the message and hence executes the decision to either allow or block the supplicant's data traffic.

WPA' method of using keys is now explained. Instead of using a single shared key for everything, WPA uses four 128-bit keys for protecting each pairwise communication: one pair of keys for protecting data encryption and data integrity and one pair of keys for protecting the communication between the two devices during their initial handshake. Collectively these four keys together are known as the Pairwise Transient Keys (PTK). Similarly each one-to-many group communication session is also protected by a Group Transient Key (GTK). The transient keys are changed for every data packet sent.

Despite the fact that so many keys are used, WPA only requires the configuration of one single key, the master key, for each pair of communicating devices or each group communication source. All other keys are derived from the master keys. Such a key organization is called a key hierarchy. In WPA, the pairwise master keys are a by-product of the authentication process as they are the session keys established by the RADIUS server at the end of the authentication procedure. Group master keys are separately selected by the group communication sources.

The PTKs are never exchanged between a pair of communicating nodes. Instead, they are computed independently by these two nodes. A four-way handshake is designed as part of TKIP to exchange the PTK computing parameters between a pair of nodes. The key generating parameters include such values that with extremely high confidence, the resulting transient key will be different for every time and every pair of nodes. At the end of this four-way handshake, both sides will have the same key generating parameters so they can generate the same PTK. Also proven during the handshake is that both sides know the same master key and therefore mutual authentication is achieved. After the PTKs are computed, GTKs are computed only by group communication sources and delivered to receivers via the already secured pairwise communications between the sources and receivers. GTKs may need to be re-computed and re-distributed from time to time due to group changes.

The data encryption keys of the PTKs and GTKs are then used by TKIP to generate a per-packet key, which is sent to an RC4 algorithm along with an IV to generate the key stream. Unlike in WEP where the shared key is used directly by RC4, TKIP performs per-packet key mixing and only the result is used by RC4. Hence the data encryption key of TKIP is much better protected. In addition the TKIP IVs are 48 bits long. With such a huge IV space, IV collision is not expected to occur and known weak keys can also be avoided. The IVs are also used by TKIP as data frame sequence numbers to prevent replay attacks.

The following is a description of 802.1x-based authentication and dynamic encryption. FIG. 1 shows the components involved in IEEE 802.1x authentication operations. In a WLAN 100 with IEEE 802.1x, a client (also known as a supplicant) 102 requests access service to an AP (or an authenticator) 104. The AP 104 opens an unauthorized port for the client 102, which only allows EAP messages to or from the supplicant (client) 102 to pass through. Through this unauthorized port, the supplicant 102 exchanges EAP messages with the authenticator 104 and the authentication server 106, which is a backend server executing the authentication algorithms. At the end of the authentication algorithm, the authentication server 106 returns an "accept" or "reject"

instruction back to the authenticator 104. Upon receiving an "accept" message, the AP 104 opens the regular network access port for the client 102 to allow normal traffic for this client 102 to go through.

Also known in the art is the Wi-Fi Protected Access (WPA). WPA is a subset of the IEEE 802.11i standard, which only contains the authentication process and an encryption algorithm known as the Temporal Key Integrity Protocol (TKIP). Since WPA can be supported by most current WLAN hardware chipsets, it is considered the transition standard towards full IEEE 802.11i compliance, which requires new chipset and hardware design.

The WPA specification does not handle ad hoc links. Only its superset standard, IEEE 802.11i, contains any specifications for providing security to ad hoc links, and in this each ad hoc link is managed individually. The IEEE 802.1x type of authentication is not used, as ad hoc links are thought to be typically created in an infrastructureless network where there would rarely be a RADIUS server available. Two devices interested in communicating via an ad hoc link must have a "pre-shared" key. This key, typically configured manually, is used as the master key in the subsequent WPA transient key generation. The device with lower MAC address will act as the supplicant and initiate the 4-way WPA key material exchange handshake. After the handshake is completed, each end sends its own group key to the other end.

IEEE 802.1d MAC Bridge protocol ("Part 3: Media Access Control (MAC) Bridges", IEEE, 1998 (IEEE 802.1d); "Part 3: Media Access Control (MAC) Bridges—Amendment 2: Rapid Reconfiguration", IEEE, 2001 (IEEE 802.1w)) is known in the art.

IEEE 802.1d employs a spanning tree protocol, which is its method of forming a packet forwarding topology while preventing forwarding loops within a network of bridging devices. In an arbitrarily connected network, each bridge includes multiple ports. These ports are attached to a number of LAN segments. Among all bridges in a network, one bridge acts as the "root" of the spanning tree. It is the bridge with the highest priority bridge identifier (the priority identifier of a bridge is either derived from the unique ID of the bridge, which is typically the lowest MAC address among those of the bridge's ports, or configured by the network administrator).

In this protocol, each bridge uses each of its ports to report the following to its neighboring bridges: its own identity, the identity of the transmitting port, the identity of the bridge that the transmitting bridge believes to be the root, and the cost of the path from the transmitting port to the root bridge. Each bridge starts by assuming itself to be the root. If a bridge receives information that is "better" than what it currently has, it will re-compute its information based on the newly received information and then send out updated control messages to its neighboring bridges. What is considered "better information" includes information such as a bridge being a better root (with higher priority bridge identifier), a shorter path towards the root, lower cost routes, etc. Eventually through information propagation, all bridges learn the active spanning tree topology and configure their ports to forward data frames accordingly. On each bridge, the port that is the closest to the root is known as the "root port". On each LAN segment, the bridge that can provide the shortest path towards the root is known as the "designated bridge" for the LAN segment.

Further known in the art are additional standard network protocols and schemes such as DHCP, NAT, ARP, reverse ARP and Proxy ARP.

SUMMARY OF THE INVENTION

The present invention provides methods and apparatus for constructing secure, portable, wireless, and multi-hop networks to provide wireless data access service.

A multi-hop wireless access network can provide a rapidly deployable, mobile communications infrastructure that is suitable for many applications such as home or office networks, emergency response networks and sensor network scenarios. Such a network based on popular wireless local area network (WLAN) protocols can be economically built, allowing client devices such as cell phones, PDAs or sensors equipped with standard WLAN network interface components to communicate beyond their own communication ranges. However, automated configuration and self-organized data forwarding mechanisms and improved security for these extended multi-hop WLANs are required.

The present invention is explained with reference to the Secure Nomadic Wireless Network (SNOWNET), a secure, portable wireless multi-hop network, but is not limited to use with the SNOWNET and is applicable to wireless networks in general.

Briefly, the secure, portable, wireless, and multi-hop network is referred to as the Secure Nomadic Wireless Network (SNOWNET), which implements a collection of access networks interconnected via a wireless ad hoc backbone network. The SNOWNET is a hierarchical network with a dynamic wireless ad hoc backbone network interconnecting a number of local access service areas. The wireless ad hoc backbone network is formed by a number of SNOWNET nodes. Each SNOWNET node includes a router that has both an access service and a wireless backbone interface. The backbone network is automatically formed and configured as an ad hoc network among the routers using MANET-style routing schemes for data forwarding.

It is an aspect of the present invention to configure the backbone network of the SNOWNET and organize data forwarding within the SNOWNET so that a SNOWNET can be quickly deployed in any area, regardless of the existing communication and power infrastructure, to provide secure network connectivity to authenticated mobile clients. Specifically, the installation process can be reduced to the placing of SNOWNET nodes in the field of operation, powering them up, and optionally orienting the external antenna attached to these nodes to connect to other SNOWNET nodes. Any configuration parameters, such as the identity of neighboring devices, address assignments and message routes, will be determined autonomously by the collaborative operations of a set of such SNOWNET nodes. The communications between SNOWNET nodes as well as between SNOWNET nodes and mobile clients will be secure. Only authorized devices (both SNOWNET nodes and mobile clients) are allowed to access and be served by the SNOWNET.

It is an aspect of the present invention to extend the WPA protocol for security on an IEEE 802.11 WLAN to operate on an ad hoc wireless multi-hop network.

More particularly, it is an another aspect of the present invention to provide a method of authenticating a new node to a secure multi-hop ad hoc wireless network using an existing wireless network node as a proxy to authenticate the new node to a master authenticator and authentication server.

The present invention includes a self-organized security method to provide data protection through encryption of the data, and authentication for client users such as attached sensor devices and for SNOWNET nodes that may dynamically join and exit from the backbone network.

The present invention includes a method of applying the WPA protocol beyond a single-link case to a store-and-forward wireless network. The extended WPA protocol is included in a SNOWNET system as a modification to the security aspect of SNOWNET as disclosed in U.S. patent application Ser. No. 10/463,857, and U.S. Provisional Application No. 60/428,700, the contents of all of which are incorporated herein by reference.

That is, the present invention includes a computer network, a method, and a computer-readable medium including a backbone network including backbone network nodes authenticated to each other and in communication with each other. The configuration of the backbone network and the organization of data forwarding within the backbone network are self-organized. Each node may be connected to a wireless access network to which clients may attach. Data can be forwarded between clients and nodes within the overall network consisting of the backbone network and all access networks attached to backbone nodes, as well as any external networks to which backbone nodes may connect.

The above computer network also includes a master authenticator node and proxy authenticator nodes among the backbone network nodes. When an unauthenticated new node requests authentication to the backbone network and the unauthenticated new node is in communication with at least one of the backbone network nodes, the at least one of the backbone network nodes becoming the proxy authenticator node for the unauthenticated new node and communicates with the master authenticator node to authenticate the unauthenticated new node to the backbone network.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 7 is a diagram of a SNOWNET Bridging Table contents.

FIG. 8 is a diagram of IEEE 802.11 Data Frame Address Field Contents.

FIG. 9 is a diagram of a SNOWNET Routing Table contents.

FIG. 10 is a diagram of Routing Update Message Contents.

DETAILED DESCRIPTION OF THE PREFERRED EMBODIMENTS

The authentication method of the present invention is applicable to wireless networks in general, and, more particularly, to the Secure Nomadic Wireless Network (SNOWNET) disclosed in U.S. Provisional Patent Application No. 60/507,934, U.S. patent application Ser. No. 10/463,857, and U.S. Provisional Application No. 60/428,700, the contents of all of which are incorporated herein by reference.

Although the authentication method of the present invention is disclosed with reference to SNOWNET, the authentication method of the present invention is not limited to such implementation.

A brief overview of SNOWNET is now presented, with disclosure of the application of the present invention to SNOWNET following.

The Secure Nomadic Wireless Network (SNOWNET) is a wireless access network technology that is portable, rapidly deployable, and secure. SNOWNET combines a wireless multi-hop backbone network with infrastructure-mode IEEE 802.11 network access services. SNOWNET router nodes may have multiple WLAN radios and are used as both standard WLAN Access Points (APs) and backbone routers.

One advantage of using SNOWNET is that in order to extend WLAN coverage to a new area that does not have an existing infrastructure network, new SNOWNET nodes need only to be deployed in the new coverage area and will automatically form a wireless multi-hop data forwarding network connecting the new area to the rest of the SNOWNET. At the same time these new SNOWNET nodes provide AP access service to their coverage areas. Clients or sensor devices that are equipped with standard IEEE 802.11 client network interface cards, attach to a nearby SNOWNET router providing access service.

SNOWNET forwards the client or sensor data within the network or to gateway routers. SNOWNETs are applicable to SoHo WLANs, sensor and surveillance networks, emergency responder communications, embedded WLAN networks, and hotspots extensions where cabling is not feasible.

The present invention provides a high level of security in SNOWNET for clients, devices such as sensors, and for the multi-hop backbone network. The present invention supports standard WLAN network interface devices as clients without requiring modifications to clients and self-organizes the backbone network for ease of deployment and portability. The present invention includes extensions to the typical link-based security mechanisms that are required to operate in a multi-hop environment.

The architecture of the SNOWNET, the functions and design of SNOWNET nodes, and the protocols executed by SNOWNET nodes, of the present invention are now disclosed, with reference to FIGS. 2-10.

Figure 1:
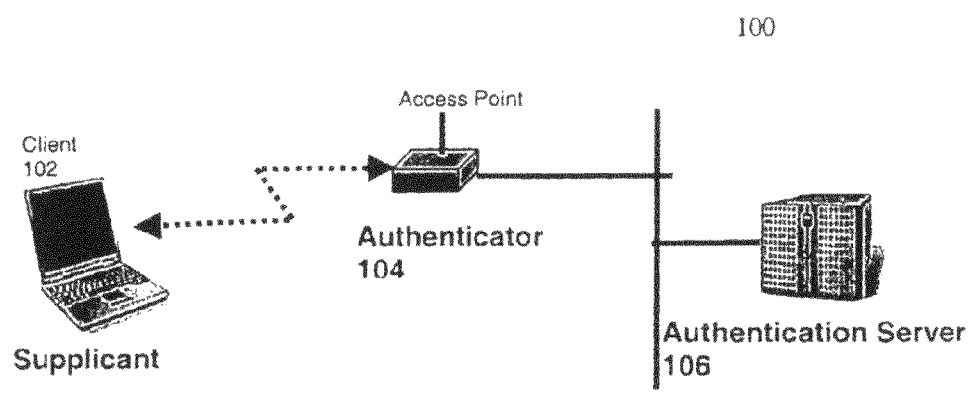
FIG. 1 is a diagram of a wireless local area network (LAN) with IEEE 802.1x.
Figure 2:
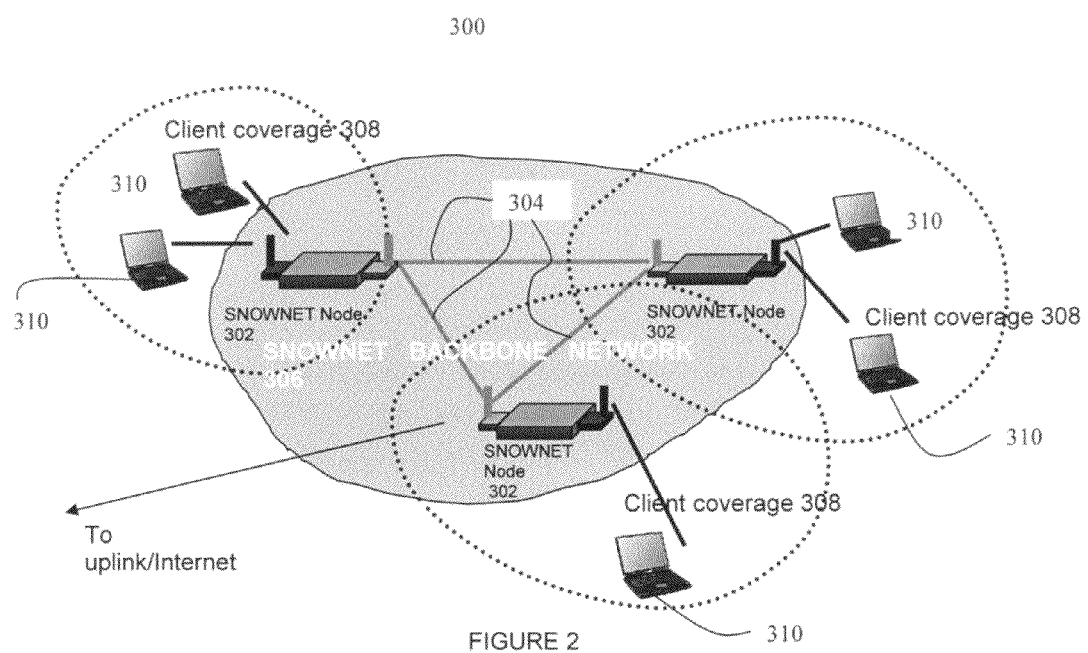
FIG. 2 of system architecture of the present invention.

FIG. 2 illustrates the architecture of a SNOWNET system network 300 of the present invention. Each SNOWNET node 302 is equipped with at least one wireless network interface, which is used for communications between peer SNOWNET nodes 302. Links 304 are formed between SNOWNET nodes 302 dynamically if wireless communication can be established between them. The network including only the SNOWNET nodes 302 and the links 304 between them are referred to as the SNOWNET backbone network 306. The interface dedicated by each SNOWNET node 302 for backbone communication is referred to as the backbone interface. Optional external antennas may also be used to extend the communication range of the backbone interfaces.

In addition to backbone interface(s), as shown in FIG. 2, a SNOWNET node 302 is typically equipped with additional interfaces to provide local network access services to mobile clients 310. In FIG. 2, all three example SNOWNET nodes 302 have at least two wireless interfaces, one for backbone communications, and the other for providing local access services. The local service interface can be of any LAN technology such as an IEEE 802.3 network interface, an IEEE 802.11 interface running in AP mode, Bluetooth, etc. The interface dedicated by a SNOWNET node 302 for client communication service is referred to as the service interface.

When a SNOWNET node 302 is equipped with wireless service interface(s), it provides wireless client coverage 308 for clients 310 within its service interface's wireless communication coverage. This is referred to as the SNOWNET node 302 providing Local Access Service for the clients 310 in its coverage area. If a SNOWNET node 302 is equipped with a wired LAN interface such as an IEEE 802.3 (Ethernet) interface, it is also possible for such a SNOWNET node 302 to provide wired local access service to clients with a matching wired communication interface via a wired Local Area Network (LAN) connected to the Ethernet interface of the SNOWNET node 302. This traffic would then be forwarded on the wireless backbone network, thus SNOWNET is capable of wirelessly connecting multiple wired networks.

There are many ways to organize the SNOWNET backbone network 306. The preferred method is to configure the communication technology used by the backbone interfaces of the SNOWNET 300 to run under peer-to-peer (also called Independent Basic Service Set, or IBSS) mode. In the case of using IEEE 802.11 network interfaces as the backbone interfaces, the interfaces should run in 802.11 Ad Hoc mode. Optional external antennas may be used to extend the communication range of the backbone interfaces. There are also special cases providing different backbone network 306 configurations. For instance if the backbone network 306 forms a "star" topology, the backbone interface of the center node may be configured as an access point (AP) and backbone interfaces of the other nodes as clients.

It is not necessary for all links 304 of the backbone network 306 to use the same link technology. Nodes with backbone interfaces of the same technology may form sub-backbones. Sub-backbones are connected together to form the overall backbone network 306 by nodes 302 with multiple backbone interfaces of different technologies that are simultaneously residing on multiple sub-backbones.

Some SNOWNET nodes may also have an additional network interface(s) 312 connected to the rest of an organizational network (e.g. the corporate headquarter network), the global Internet or some other external network. These nodes, called SNOWNET gateways act as gateways for the SNOWNET 300 to reach the Internet or other external networks. These links may be of various link technologies, e.g. an Ethernet cable connected to a LAN for a fixed-group network, a wireless LAN interface to an AP, a Point-to-Point Protocol (PPP) connection, or a 3G wide-area wireless communication interface, etc.

Some network interfaces of the SNOWNET node 302 may even be virtual interfaces. For instance, a physical interface may be multiplexed or time-shared to create multiple virtual interfaces that can be used for different purposes. For example, the SNOWNET node 302 of the present invention may allow algorithms to be built so that the same IEEE 802.11 interface may run in ad hoc mode in some time slots to act as the backbone interface and in AP mode in other time slots to act as the local access service interface. Moreover, a SNOWNET node may dynamically change one of its AP interfaces to a backbone interface or vice versa.

Communications in a SNOWNET 300 are organized into two levels: backbone communication and local access communication. In the bottom level of the two-layer hierarchical network 300, SNOWNET nodes 302 provide access services to sensors and other regular clients 310 with matching standard network interfaces. Hence, normal clients 310 may connect to SNOWNET 300 in the same fashion as they connect to any other standard wired or wireless LAN. In the top level, SNOWNET nodes 302 form a wireless backbone network 306 among themselves. Thus the deployment topology of the wireless network 306 is not constrained by the fixed connections to a wired network infrastructure, permitting changes in SNOWNET node 302 locations.

SNOWNET nodes 302 relay communication between these two levels. Therefore a typical intra-SNOWNET communication path between two clients receiving local service from different SNOWNET nodes 302 may include the link between the source mobile client 310 and the SNOWNET node 302 serving the source client 310, a number of SNOWNET backbone links, and finally the link between the destination client 310 and its access service SNOWNET node 302. If the destination is on another external network, then the communication path would include the SNOWNET gateway node that is forwarding traffic for that network.

Backbone links 304 between SNOWNET nodes 302 are dynamically established subject to the communication parameters and range constraints of the physical environment. Through topology information exchange, the SNOWNET data forwarding protocol is able to dynamically adjust and self-organize the data forwarding routes based on the current topology of the wireless backbone 306 and the current attachment distribution of clients 310. Thus, SNOWNET nodes 302 are portable and the configuration of the network 300 can adapt to changing usage patterns by adding, deleting or moving of SNOWNET nodes 302.

In an embodiment of the security mechanism of the present invention, an extension to the data forwarding protocol of storing-and-forwarding of IP traffic includes the link layer identities (e.g., MAC addresses) of the SNOWNET nodes 302 in the topology information exchange and route computation. This enables the extended forwarding protocol to compute routes for data link layer frames even if the destination is several hops (or nodes 302) away.

In an embodiment of the invention, an encapsulation mechanism, called SNOWNET envelopes, forwards data link layer frames across an arbitrary network layer topology 300.

Figure 3:
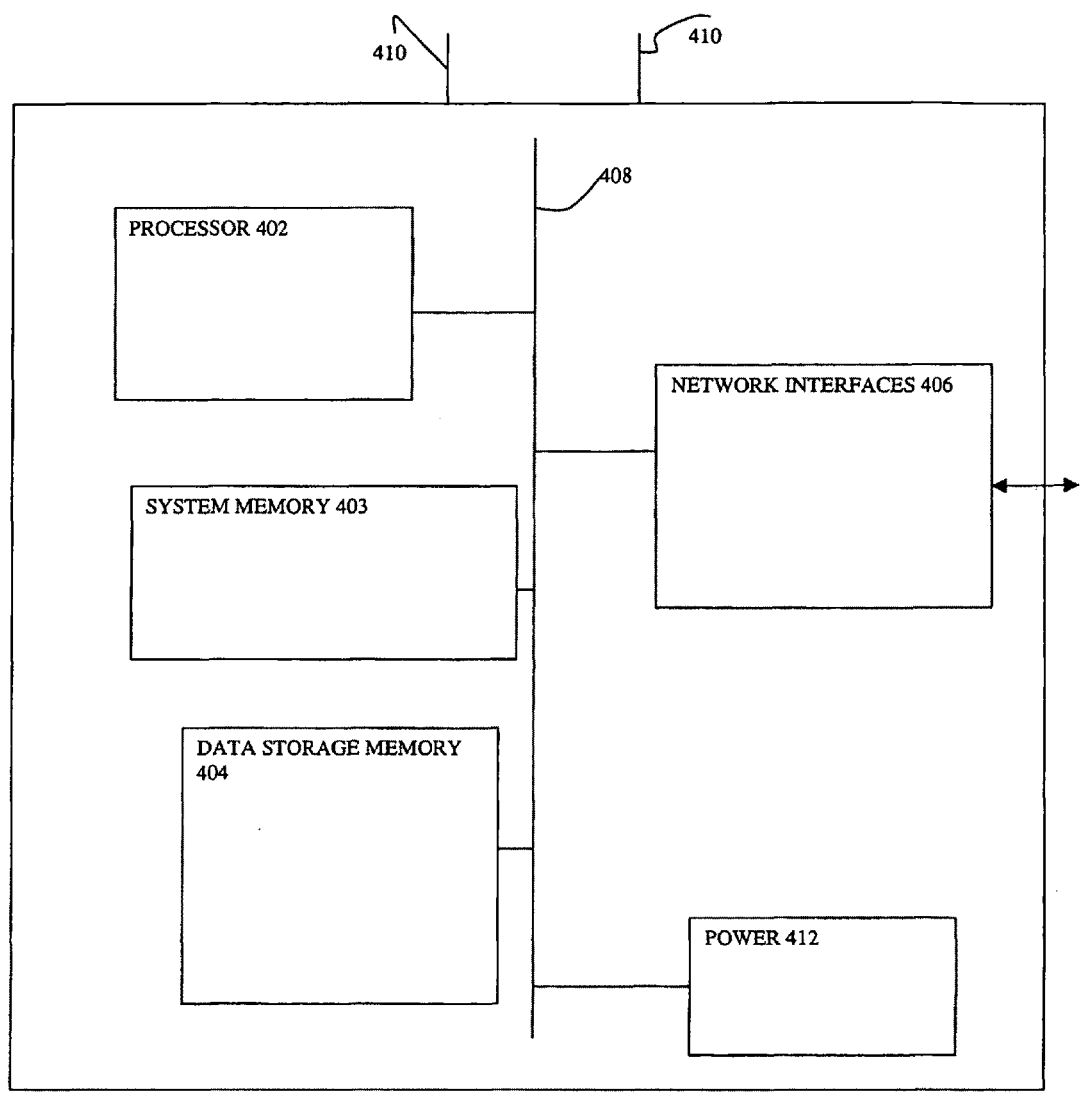
FIG. 3 shows a diagram of the hardware architecture of a SNOWNET node 302 of the present invention.

SNOWNET Node 302 hardware is now disclosed. FIG. 3 shows a diagram of the hardware architecture of a SNOWNET node 302 of the present invention.

Each SNOWNET node 302 can be implemented as an embedded system comprising a processor 402, system memory (RAM) 403, data storage memory (Flash) 404 for software and security related data such as certificates and keys, one or more network interfaces 406, and a system bus 408 connecting these components. Each node 302 has a manageable and portable form factor as well as protective casing. Optionally, each node 302 may be equipped with external antennas 410 to extend the communication ranges of its wireless network interfaces 406. These network interfaces 406 provide local wired or wireless access, wireless backbone access, or wired or wireless gateway access.

A SNOWNET node 302 configuration depends on its specific intended use in the network. The typical SNOWNET node 302 in a remote location would have two wireless interfaces 406: one for backbone communication and one for local access service. A SNOWNET gateway node 302 may have these two wireless network interfaces plus a third network interface 406, such as a wired Ethernet interface to connect to the external network.

Since a SNOWNET node 302 is portable, a SNOWNET node 302 uses DC power that can be supplied by batteries as the main power source 412. DC power can be provided from AC converters from the electric outlet, battery charging devices, solar energy devices, automobile battery outlets, or other power generating devices.

In certain operational scenarios when a battery is the only possible energy source, it is important for the collaborative network 300 formed by these nodes 302 to be both power-efficient and power-aware. SNOWNET nodes 302 implement power management procedures to preserve battery power when possible.

The file system 404 on a SNOWNET node 302 is an encrypted file system. All information stored in data storage 404 is encrypted. When the node 302 is booted up, the operator provides a decryption key supplier (i.e. a Smartcard, a USB key, etc). The boot up sequence of the node 302 locates and loads the decryption key from the supplier. Only then can the file system 404 be accessed. Critical operational system files are decrypted and loaded into system memory 403 to be executed. When a node 302 is disconnected from the authentication and communication key management server of the SNOWNET (the SNOWNET master authenticator as detailed later), i.e. not receiving key management messages from the server, for a certain period of time, an automatic power shut down is performed. Other tampering with the SNOWNET node 302 is prevented by physical security methods on the node 302.

The above-mentioned feature of the present invention reduces the risk to the whole SNOWNET 300 if one SNOWNET node 302 is compromised by an unauthorized user. Without a valid connection to the decryption key supplier, the SNOWNET node 302 is inoperable after it has been powered down unless a valid decryption key supplier is applied. Even in the case that the attacker maintains a power supply to the SNOWNET node 302, the node 302 will be isolated from the other SNOWNET node population 300 using this timeout mechanism.

One embodiment of the present invention is implemented as a Soekris Engineering Net4521 Board with a 133 MHz AMD Elan SC520 system-on-chip CPU with interfaces including 2 PCMCIA, 1 CF, 1 Serial, 1 Mini-PCI, and 2 Ethernet; dual wireless interfaces including two 802.11 cards for backbone and access points, and a gateway configuration including a PCMCIA card for wireless uplink and a card for 802.11 backbone; OpenBSD or FreeBSD Operating Systems; and open software including Free Radius, HOSTAPD, Xsupplicant, and Xauthenticator.

Figure 4:
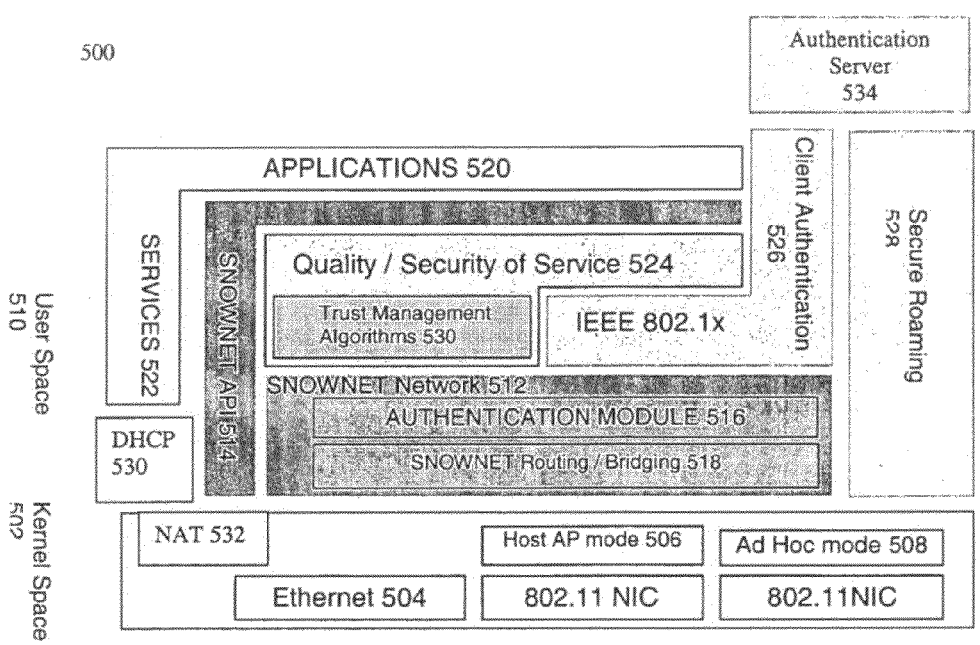
FIG. 4 is a diagram of the software components of a node of the present invention.

FIG. 4 is a diagram showing the SNOWNET node 302 software architecture components 500. The SNOWNET node 302 software components 500 are stored in the data storage memory 404 of each SNOWNET node 302.

The software components 500 include operating system kernel space drivers 502 for various network interfaces, including drivers for Ethernet 504, IEEE 802.11 Network Interface Card (NIC) in Host AP mode 506, and 802.11 NIC in Ad Hoc mode 508. All other SNOWNET components reside in user space 510, or in kernel space 502 to improve performance. In particular, a Network Address Translation (NAT) module 532 resides in kernel space to provide the translation between external Internet addresses and the internal SNOWNET address space if necessary.

There are two major SNOWNET software modules, a SNOWNET network layer 512 and a SNOWNET API 514. Within the SNOWNET network layer 512, the functions of SNOWNET node authentication 516 and SNOWNET Routing/Bridging 518 are implemented. For SNOWNET nodes providing client device access service, a standard DHCP module is included to dynamically assign addresses to clients. The SNOWNET Application Programmers Interface (API) 514 offers an application development interface so that other applications 520 and services 522 can access lower-level, SNOWNET specific features such as Routing Table information (shown in FIG. 9). Examples of applications that could be implemented in a SNOWNET network 300 include Wireless Voice, streaming data and many other network functions. In an embodiment, the API is defined and implemented for the Network Layer 512 and the Client Authentication Module 526 and includes program calls in the C language.

The SNOWNET network layer 512 is implemented as a network service to the other middleware components of a SNOWNET node 302. These optional SNOWNET middleware components may include Quality of Service module 524, the Security of Service module 524, trust management algorithms 530 and client authentication module 526. The Quality of Service module 524 controls the share of the communication bandwidth given to each client. The Security of service 524 provides levels of additional security depending on the needs of the client. The trust management algorithms deal with rules for initial bootstrapping of the system and for allowing unknown clients and routers to become part of the system. The client authentication module 526 implements the 802.1x policy for admitting and identifying clients and is discussed further below.

Each SNOWNET node 302 also includes a module supporting secure roaming for clients 528. This is the module 528 that transfers the "trust and credentials" of a client from one SNOWNET node 302 to another when the client 310 moves from one SNOWNET node's local service area to another node's local service area. With the help of this module 528, the client 310 does not need to go through the entire authentication phase again in the new local service area. Thus the time gap between the client 310 being served by two SNOWNET nodes is relatively smaller and the handoff is relatively smoother.

A SNOWNET node 302 may optionally host an authentication server 534 such as a RADIUS server 303 that will provide all of the necessary checking of credentials, generation of keys and storage of credential information.

Security features of the SNOWNET of the present invention, including the SNOWNET implementation of client authentication and access communication encryption 526, SNOWNET node authentication and communication encryption extended 516, for SNOWNET, and authentication and security during handoff, are now discussed.

Figure 5A:
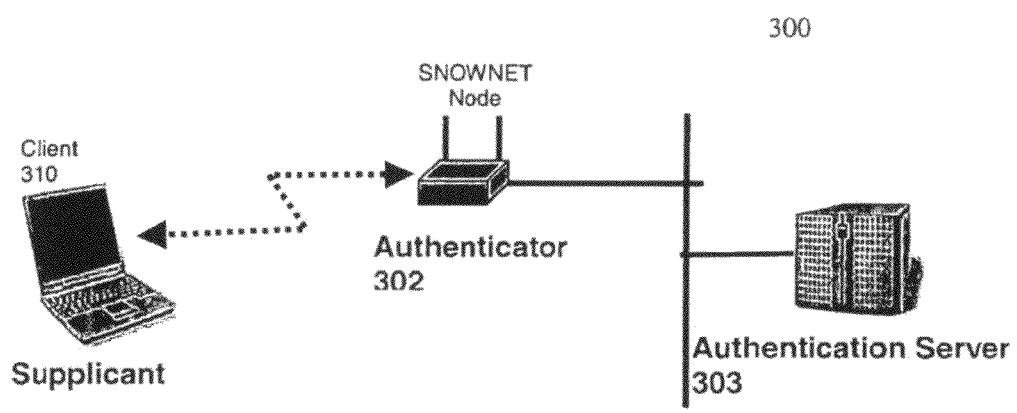
FIGS. 5A and 5B are diagrams of SNOWNET implementation of IEEE 802.1x.

The SNOWNET implementation of client authentication and access communication (communication between clients and their service SNOWNET nodes) encryption is now discussed, with reference to FIG. 5A. Two variations of the method are disclosed. They are an extended IEEE 802.1x client authentication and encryption method and a standard WPA client authentication and encryption method.

As shown in FIG. 5A, a supplicant (or client) 310 accesses the SNOWNET 300 through the access point interface of a SNOWNET node 302. The SNOWNET node 302 serves as an authenticator, and is in communication with an Authentication Server 303.

If the network environment of the SNOWNET 300 permits connectivity to a RADIUS server (C. Rigney, A. Rubens, W. Simpson, and S. Willens, "Remote Authentication Dial In USER SERVICES (RADIUS)", RFC 2138, APRIL, 1997), SNOWNET 300 uses an existing organizational RADIUS server as the backend authentication server 303. Otherwise, one SNOWNET node 302 can be configured as an authentication server 303 by running the RADIUS server software. Before SNOWNET deployment, this node 303 downloads all necessary certificates into its system memory 404 so it can carry out the authentication duties. Such certificates include those for SNOWNET nodes 302 as well as for all authorized clients. Additional hardware resources such as system memory and a higher-performance CPU may be installed on an authorization server node 303 to improve performance. During deployment, the RADIUS server node 303 must be activated before any other SNOWNET nodes 302 are turned on and remain active until all other SNOWNET nodes 302 are turned off.

In the first method SNOWNET nodes 302 that provide local network access services act as authenticators in the IEEE 802.1x architecture using its Client Authentication Module 526. Regular mobile clients 310 are supplicants. SNOWNET is compatible with many existing off-the-shelf client side implementations of supplicant functionality, e.g. Windows XP, Xsupplicant, etc. To execute the authenticator functions, the Client Authentication Module 526 in SNOWNET nodes 302 run the Open1x Authenticator software, an open source implementation of the IEEE 802.1x authenticator (Open1x, on the world wide web at open1x.org) 526. SNOWNET Client Authentication Module 526 enhances the standard IEEE 802.1x security by offering additional features such as mutual authentication between the mobile clients and the network and dynamic key rotation. Mutual authentication between mobile clients 310 and the SNOWNET network 300 is supported through the successful completion of the authentication process, as this can only be accomplished if both the client 310 and SNOWNET nodes 302 are properly identified using a public key infrastructure. Dynamic keys in which the security encryption keys are changed periodically and redistributed through the SNOWNET network 300 is one of the features supported by SNOWNET 300.

The details of the Client and Network Mutual Authentication procedure in SNOWNET 300 are as follows. During the EAP handshake between the mobile client 310 and authenticating SNOWNET node 302, the client 310 sends an EAP start message and the SNOWNET node 302 returns an EAP message requesting the user's identity. The client 310 returns his certificate encrypted using a public key encryption mechanism with the authentication server's 303 public key. The authenticator 302 then forwards this encrypted certificate to the authentication server 303. The authentication server 303 verifies the client certificate and if the certificate is valid, the authentication server 303 generates a session key for the client and sends the session key to both the client 310 and authenticator 303. Using this session key, the AP 302 encrypts the local shared WEP key and sends the encrypted shared key to the client 310. To support mutual authentication, the authentication server 303 also encrypts the certificate for the whole SNOWNET 300 using the client's 310 public key and sends the encrypted certificate to the client 310 so the client 310 can authenticate the network 300 as well. If the client 310 accepts the network certificate, the client 310 decrypts the local shared WEP key, configures the shared key into its IEEE 802.11 device, and begins to access the network 300.

Using the same RADIUS server 303, SNOWNET 300 dynamically and periodically updates the shared keys used for communications between clients 310 and APs 302. SNOWNET 300 does not need to update the shared keys when a client 310 disconnects from the network 300 because the shared key used at that moment will soon be replaced by periodical key refreshing.

In the second method, the standard WPA style client authentication and encryption scheme is supported. SNOWNET assumes that a WPA-capable RADIUS server is either running within the SNOWNET or is reachable from the SNOWNET through a gateway service. Each SNOWNET node that provides AP service supports the functions of an IEEE 802.1x authenticator. When a client is requesting network access service, it begins with an EAPOL-Start message; then, the standard WPA authentication procedure continues. After the IEEE 802.1x authentication execution completes, both the client 310 and the SNOWNET AP node 302 providing local access service will receive a session key from the RADIUS server. The session key is used as the master key for WPA transient key generation. The current group transient key is also generated and sent to the client by the SNOWNET AP node 302. When a client disassociates from a SNOWNET AP node 302, the AP node needs to update the group transient key. The new group key is then sent to each attached client of the AP node 302 using EAP-Key messages. In addition to WPA security, SNOWNET also supports older style security for clients that do not support WPA. In this case the session key is used as the shared WEP key directly. The SNOWNET AP node 302 will automatically regenerate and install new session keys periodically.

In a different embodiment of the client authentication and access communication encryption function of the present invention, the Client Authentication Module 526 is integrated into the AP function of the SNOWNET nodes as part of the HostAP module 506

Backbone Authentication and Security of the present invention for SNOWNET is now explained. The Backbone Authentication and Security of the present invention is included in the Authentication Module 516 of the present invention.

In the previous section the focus has been on how authorization and encryption key management are done between mobile clients (supplicants) 310 and authenticators 302. In this section the topic is authorization and key management among the SNOWNET nodes 302 themselves.

When IEEE 802.1x is adopted for typical 802.11 WLANs, there is an implicit assumption of an existing wired infrastructure (including access points and network cables interconnecting the access points) in which the topology of the network between the access points (APs) is static and the APs are trusted entities. Hence, there is a clear separation between the roles of supplicants (mobile clients) and authenticators (APs) and there is no need to raise the issue of the authenticity of the APs because they are already installed and connected via relatively secure wired connections and therefore assumed to be secure and authentic.

In SNOWNET 300, the backbone network 306 is wireless and dynamic, permitting new SNOWNET nodes 302 to join and others to leave the backbone network 306 during normal operation. Before these new nodes 302 can provide network access and authentication services to regular mobile clients 310, the nodes 302 first need to be admitted to the backbone network 306. In other words, SNOWNET nodes 302 themselves must also be authenticated within the SNOWNET 300.

Only after being admitted to the backbone network 306 may the new SNOWNET node 302 begin to offer network access services to its local clients 310.

Figure 5B:
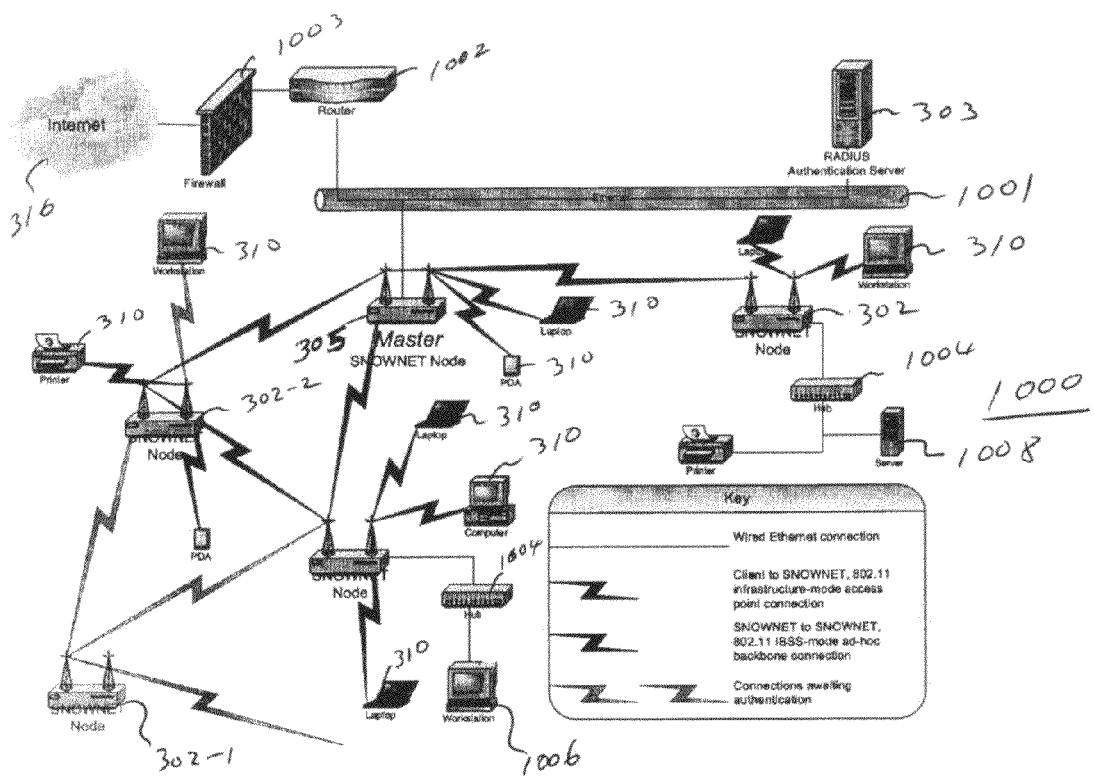

FIG. 5B illustrates the typical components involved in SNOWNET authentication operations. SNOWNET backbone security extends standard IEEE 802.11 security mechanisms, which are designed for single hop wireless networks, to multi-hop networks. SNOWNET data security is based on WPA security, with modifications accommodating the special characteristics of SNOWNET.

More particularly, FIG. 5B shows a SNOWNET authentication architecture 1000 in which SNOWNET nodes 302 are coupled to each other by a wireless 802.11 backbone connection, SNOWNET nodes 302 are coupled to clients 310 by wireless 802.11 infrastructure-mode access connection points, and SNOWNET nodes 302, RADIUS server 303, and router 1002 are coupled to Ethernet 1001 by wired connections.

Security in the backbone network of SNOWNET is now discussed. In an embodiment of the present invention, the WPA's security model is extended to cover the entire backbone network 306. For authenticating SNOWNET nodes, the IEEE 802.1x authentication is extended by the present invention to support multi-hop wireless network. For securing communication among SNOWNET nodes, since the current WPA pairwise security does not support peer-to-peer communications, all SNOWNET nodes communicate using a common key, following the WPA group security. After SNOWNET nodes are authenticated, they are provided with the group transient key. This key is also updated periodically.

A RADIUS server 303 is assumed to be reachable from the SNOWNET. This server 303 may or may not be the same RADIUS server 303 handling client device 310 authentications. Within the SNOWNET backbone 306, one node 305 is designated as the authenticator for the entire backbone network 306. This node 305 is named the "Master Authenticator (MA)" 305. The identity of the MA 305 is included in SNOWNET topology exchange messages and sent to all authenticated backbone nodes 302 already on the backbone. The identity of the RADIUS server 303 is known to the MA 305. During SNOWNET deployment, the MA 305 is deployed before any other SNOWNET nodes 302 and is assumed to be able to reach the backbone RADIUS server 303. New backbone nodes 302 are added to the SNOWNET backbone 306 in an iterative manner as they are authenticated by the MA 305 and RADIUS server 303.

A problem is that EAPOL messages are link layer data frames and cannot be transmitted between nodes 302 separated by other store-and-forward nodes operating at the network layer, as in SNOWNET.

The SNOWNET backbone 306 is capable of forwarding network layer data packets. In an embodiment of the present invention, EAPOL frames are encapsulated in special IP or higher layer packets. A special SNOWNET packet format is defined for encapsulating EAPOL packets, called Envelopes. SNOWNET Envelopes are transmitted across the backbone network just like other user data messages encoded with the encryption mechanism of the SNOWNET backbone 306.

The SNOWNET Envelope packets are network-or-above layer packets. In an embodiment of the invention, a TCP packet is used as the method, although IP or UDP packet may also be used depending on each individual system's requirement and implementation details. However, in the case when an IP packet or UDP packet is used as SNOWNET Envelopes, additional mechanisms may be needed to increase delivery reliability. When an EAPOL packet is delivered over a single WLAN link, the sender is able to find out if the receiver has received the packet via a link layer acknowledgement. A similar acknowledgement function is provided by the SNOWNET Envelope packets.

The embodiment of the SNOWNET 1000 shown in FIG. 5B includes an Ethernet 1001 network coupled to the MA 305, RADIUS server 303 coupled to the Ethernet 1001, a router 1002, a firewall 1003 coupled to the Internet 316, hubs 1004, workstations 1006, and servers 1008.

Backbone Message Exchange

Figure 5C:
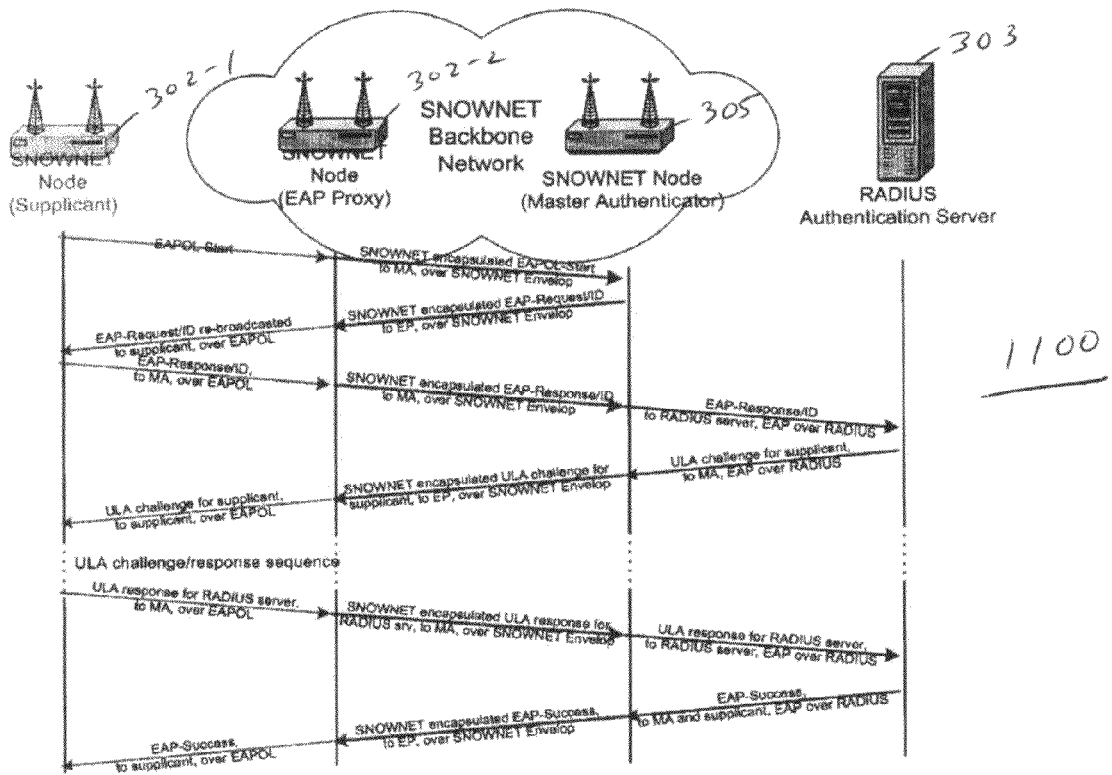
FIG. 5C is a diagram of messages exchanged during authentication of a new node in the present invention.

FIG. 5C shows the backbone authentication messaging sequence 1100 of the present invention.

The messages being exchanged during the authentication stage are illustrated in FIG. 5C. When a new SNOWNET node 302-1 tries to join the backbone network 306, the new SNOWNET node 302-1 acts as a supplicant and sends out an EAPOL-Start message. Any SNOWNET backbone node 302 that is within range may receive the EAPOL-Start message. The backbone node 302 hence becomes a proxy authenticator whom we name EAP Proxy (EP) 302-2 for the new node 302-1 and encapsulates the message within a SNOWNET Envelope message addressed to the MA 305. Multiple SNOWNET nodes 302 may actually receive and forward the EAPOL-Start message as an EP 302-2.

After being forwarded by the SNOWNET backbone 306, the Envelope message reaches the MA 305 and the outer Envelope specific fields are peeled off and the EAPOL-Start message is revealed and passed to the authenticator function of the MA 305. The authenticator 305 selects one of the EP's 302-2 as the preferred EP 302-2 and then replies with a standard IEEE 802.1x EAP-Request/ID message. Again, this EAP message is encapsulated in another SNOWNET Envelope message and the Envelope is addressed to the preferred EP 302-2. From this point on, the standard IEEE 802.1x style authentication is carried out among the supplicant 302-1, the MA 305, and the backend RADIUS server 303.

For EAP messages from the supplicant 302-1 to MA 305 (or RADIUS server 303), the EP 302-2 receives the link layer frames from the supplicant 302-1, encapsulates them in SNOWNET Envelopes and sends them towards the MA 305. For EAP messages of the opposite direction, the MA 305 encapsulates those using SNOWNET Envelops addressed to the EP 302-2. The EP 302-2 then unencapsulates the EAP frames from the Envelopes and forwards the resulting EAP frames to the supplicant 302-1 over the ad hoc link between them.

Due to the ad hoc and dynamic nature of the network 300, the new supplicant 302-1 will not know a priori the identity of an EP 302-2. This is different from authentication between a client 310 and an AP, where the identity of the AP is known to the client 310. Thus the EAPOL-Start message is sent in plaintext using a link layer broadcast address. Any SNOWNET backbone node 302 who receives and reacts to the message becomes an EP 302-2 and there may be multiple EPs 302-2 that forward the EAP-Start message to the MA 305.

The MA 305 selects a preferred EP 302-2 according to various criteria, such as link quality, least loaded node or first arrival, and only uses this EP 302-2 to correspond with in subsequent steps. EAP messages in subsequent steps from the MA 305 to the supplicant 302-1 are explicitly addressed to the preferred EP 302-2 and similarly on the return path. The remaining EPs 302-2 will drop out of the communications unless a new EAPOL-Start is received.

Backbone Key Handling

As a result of the IEEE 802.1x authentication procedure, a session key is established between the new SNOWNET backbone node 302-1 and the MA 305 and the WPA pairwise transient key is generated from that. After the WPA pairwise transient key is established, the MA 305 forwards the current group key to the new node 302-1. The group key is used to protect the communications among all backbone nodes 302.

It is also the MA 305's responsibility to generate and update the group key. When a current SNOWNET backbone node 302 leaves the backbone network 306, the MA 305 renews the group key. In addition, since not all node 302 departures are immediately known to the MA 305, the MA 305 will generate this new key on a periodic basis. The choice of a good lifetime of each group key is dependent on the dynamics of the network 300. A new group key is delivered from the MA 305 to all SNOWNET backbone nodes 302 individually via EAP-Key messages protected with the pairwise EAP-Key encryption keys and integrity keys derived from the authentication procedure.

Newly generated and distributed group keys are not effective immediately but are scheduled to be used at a future time. The gap between the current time and the new key effective time is long enough to assure that the new group key is received by all backbone nodes 302 with high likelihood and to allow for any backbone node 302 to specifically request the new key if it is believed to have missed the delivery of the new key (e.g. because of lost packets). Although the new group key is not used immediately, it is installed into the IEEE 802.11 hardware as a secondary key. After the new group key goes into effect, the old group key is also kept in the hardware as a secondary key for a short period of time. There is a time window during which both new and old group keys are accepted for decryption to accomplish the key synchronization among all backbone nodes. Since typical IEE 802.11 WLAN interface hardware supports at least four encryption keys at any time, depending on the settings of various timer values, more than one group key may be transmitted to the new node. Among these keys, one is used as the current effective communication key and the rest will be used as future communication keys.

The MA 305 is included in SNOWNET backbone security as the pairwise security binding is only between the MA 305 and other SNOWNET backbone nodes 302. The total number of WPA transient keys the MA 305 needs to maintain for a backbone network 306 of N nodes 302 is N, with N−1 TKIP pairwise transient keys and 1 group key. The number of keys being managed by the network 306 grows as O(N).

SNOWNET backbone communications are encrypted with the group transient keys. This transient group key is used as the temporal key in the TKIP phase 1 key mixing. If TKIP is not supported in a particular implementation of SNOWNET node 302 hardware and firmware, the group key may also be directly used as a WEP key (a hash function is needed to format the transient group key into a key format compatible to WEP). However, in this case most of the problems associated with WEP would remain unsolved.

An advantage of using the SNOWNET security mechanism in this case is that the MA 305 is able to generate and deliver new group keys to all backbone nodes 302 across a multi-hop network so that each group key only has a short lifetime and during which attackers are unlikely to gather enough packets to break the key.

An explanation of SNOWNET in which the present invention is included now continues.

Authentication and Security During Client Handoff is now explained.

When a mobile client 310 moves from the service area of one SNOWNET node 302 to that of another SNOWNET node 302, several tasks are performed to ensure the mobile client 310 receives uninterrupted data traffic.

Generally when roaming in an 802.11 WLAN, the first event to occur is a link layer handoff. That is, upon some predefined triggering event, the communication link between the mobile client and its current AP is broken and a new communication link between the mobile client and a new AP is established. Then the system performs the network layer handoff. That is, the mobile client establishes its new topological attachment (to its new AP) and propagates the information to the whole network so that data traffic from/to the mobile client can be properly directed. In this section, the issues related to authentication and security during link layer handoff are addressed. In the following section, network layer handoff is discussed.

The details of the link layer handoff operations vary depending on the link layer technology. In the case of current IEEE 802.11 WLAN technology, link layer handoff is done in a "break-before-make" fashion. When a mobile client discovers that the quality of the signal from its current AP drops below a predefined threshold, the mobile client will try to find a new AP with better signal quality. Optionally the mobile client may send out a disassociation message to its current AP to notify the current AP of the departure so that the AP can remove any states stored for the mobile client. Then the mobile client performs a scan over all channels to determine available APs and their characteristics and the selects its new target AP.

After the new AP is selected, the 802.11 standard specifies an authentication procedure for the mobile client by the new AP. However, as discussed herein above, the shared-key authentication scheme of 802.11 is not effective. On the other hand, many deployed 802.11 systems are open systems in which any mobile client is authenticated by default.

After authentication, the mobile client tries to connect to the new AP by sending to the new AP an Association Request. Upon the receipt of an Association Request, the AP sends back an Association Response. If the request is accepted, this response contains a "successful" value. After receiving an Association Response with "successful", the mobile client acknowledges the message. Then the new connection is established and the mobile client can send and receive via the new AP.

Similarly, in SNOWNET 300 when a mobile client 310 roams from one SNOWNET node's 302 access service area to that of another, the mobile client 310 executes the functions of scan, authentication, and association.

SNOWNET 300 employs an optimized scan scheme to reduce the time needed to complete a scan. The reason for a mobile client 310 to perform a scan over all channels is that the client 310 does not know which SNOWNET nodes 302 are available in the area of the mobile client 310. Putting the network interface of the mobile client 310 into promiscuous mode does not solve the problem because the SNOWNET nodes 302 may operate on different channels than the client's 310 current channel and thus still can not be heard. In SNOWNET 300, the clients 310 may perform scan operations even during normal operation to constantly monitor the availability of nearby SNOWNET nodes 302 and their characteristics. This monitoring scan is only done under the condition of not interrupting ongoing communication and is not performed when battery lifetime becomes a concern. With such a list of recently heard nearby SNOWNET nodes 302, when a handoff is needed, the mobile client 310 may focus only on those SNOWNET nodes 302 that are on the "recently heard" list and have good signal quality. Thus, the need for a full channel scan is avoided and the time the mobile client 310 takes to select its new service node 302 is reduced. In cases when the "recently heard" list is created very recently, the mobile client 310 may immediately select its new service node directly from the list without additional scanning.

The association procedure in SNOWNET 300 is similar to what the current 802.11 standard specifies and thus is not discussed here. The focus of this section is on authentication and security with respect to roaming.

Authentication is a lengthy process which requires both communication and processing resources. Thus, it is desirable that authentication will not be performed during handoff. The present invention includes an authentication and security handoff mechanism that smoothly and securely relocates the mobile client 310 to its new access service area with minimal delay. The mechanism is based on a public key system. It is assumed that all SNOWNET nodes 302 have a pair of keys, one public and one private. Each SNOWNET node 302 is aware of the public keys of other neighboring SNOWNET nodes 302. Each mobile client 310 also knows the public keys of the nearby SNOWNET nodes 302. This feature is fulfilled by either pre-installation or an external public key exchanging protocol.

When such an authentication and security handoff service is needed, a mobile client 310 needs to request that its current SNOWNET service node 302 provide a ticket. This ticket includes information such as the mobile client's identity and its current access service SNOWNET node's identity. The ticket includes other fields such as the time when the ticket is issued, its expiration time, a session key transmission key, check sum, etc. The ticket may also include some random bit padding before and after the real fields. This ticket is encrypted by the SNOWNET node 302 using its private key. This encrypted ticket is then sent to the requesting mobile client 310. Because the delivery of this ticket is over an established secure communication session between the mobile client 310 and its current SNOWNET service node 302, such a delivery is secure.

Optionally, if the mobile client 310 supports public key cryptography and has the computing resources to decrypt a message encrypted using asymmetric cryptography, the SNOWNET node 302 may encrypt the already encrypted ticket (with the SNOWNET node's private key) again with the mobile client's public key. Upon receiving such a double encrypted ticket; the mobile client 310 decrypts the ticket using the mobile client's private key and stores the ticket (still encrypted with the service node's public key). This way, even if such a ticket is captured by a third party; the third party can not decrypt the ticket.

After the mobile client 310 selects its new SNOWNET service node 302, the mobile client 310 sends to the new SNOWNET node 302 a re-authenticate request message. This message includes its own identity, the identity of its previous service node, and the stored ticket. The message is encrypted using the new service node's public key.

Upon receiving such a re-authentication message, the new service node 302 first decrypts the message using its own private key. Then the new service node 302 decrypts the ticket (still encrypted with the previous service node's private key) included inside of the message using the public key of the previous service node. If the ticket is valid, the service node 302 generates a temporary communication session key for the mobile client 310. The service node 302 sends back to the client 310 a re-authentication response message with a "successful" flag. The message is encrypted with the session key transmission key included in the ticket and sent to the mobile client 310 over the open channel. After receiving the temporary communication session key, the mobile client 310 may send and receive message traffic via the new service node 302.

The temporary communication session key is only valid for a short period of time. After the temporary communication session key is expired, use of the temporary communication session key is not permitted for communication between the mobile client 310 and its new service node 302. Thus, during the valid window of this temporary communication session key, the mobile client 310 must complete the normal mobile client authentication procedure as described earlier in this section. That is, the mobile client's credential needs to be transmitted to the RADIUS server 303 of the SNOWNET 300 for the client 302 to be authenticated. After being authenticated by the RADIUS server 303, the RADIUS server 303 will start to issue and manage session keys for the communication between the mobile client 310 and service node 302 in the normal fashion.

SNOWNET IP Address Management

Before describing how data is forwarded within SNOWNET, how addresses are managed is first described in more detail.

SNOWNET nodes may have multiple communication interfaces, each having a globally unique identifier known as the hardware address or MAC address of the interface. Because MAC addresses are assigned to communication interface hardware by the manufacturers and they are globally unique, they are also commonly used as unique identifiers of their hosting devices. They are also used in SNOWNET. For SNOWNET nodes with more than one communication interface, and thus multiple MAC addresses, the lowest MAC address is used as the unique node identifier of the SNOWNET node.

MAC addresses are only used for direct LAN communication between network interfaces reside on the same LAN. Internet Protocol (IP) addresses are also assigned to network interfaces so they can be globally addressed because IP addresses reflect the attachment of network interfaces in the global Internet. Now SNOWNET IP address management of the present invention is described. As discussed in greater detail later, SNOWNET may operate in two different data forwarding modes: bridging mode and routing mode. The IP address management is done differently in these two modes.

When SNOWNET operates in bridging mode, its IP address management is very simple. The whole SNOWNET, including all clients and SNOWNET nodes, includes a single broadcast domain. All devices including both SNOWNET devices and client devices share the same IP address space. Either, a special SNOWNET node is configured as a DHCP server and manages IP address assignment for the whole network, or a DHCP server is reachable from the SNOWNET. The DHCP server has a pool of addresses for it to lease to clients and SNOWNET node devices. IP addresses of expired leases are returned to the address pool for future assignments. After a new device, either a SNOWNET node or a client device, is authenticated, it will issue a DHCP request asking for an IP address assignment and other related IP communication parameters such as the addresses of the default routers for the SNOWNET and Domain Name Servers (DNS). This request is broadcast to all devices in the SNOWNET, including the DHCP server. All other nodes will ignore the request except the DHCP server node, which will reply to the request with an IP address allocated from its IP address pool. Other requested parameters are also included in the reply message. The reply is sent back to the new device and the new device may use the assigned IP address and other parameters to configure itself.

When SNOWNET operates in routing mode, the address management is more complicated. The typical configuration is that each SNOWNET node providing local access services will have its own sub-networks and manage the addressing within these sub-networks. For managing client IP addresses for clients, each such access service providing SNOWNET node has a DHCP server running for assigning IP addresses to clients connected to its service interfaces.

A separate sub-network address space is allocated for the backbone interfaces of the SNOWNET nodes. The administrator of a routing mode SNOWNET needs to configure the address space of this separate backbone sub-network. What need to be configured for each new SNOWNET node are the IP address from the backbone IP address space for its backbone interface, and one IP address block for each of its access service interfaces so the DHCP server can be appropriately configured. We include two different methods of managing these IP addresses for SNOWNET in the present invention, a distributed method and a centralized method The first method is a distributed method. After a new SNOWNET node is accepted into the network, it will send an Address Request to the SNOWNET node acting as its EAP Proxy (EP) asking for addresses for its backbone interfaces and address spaces for its local service interfaces. By consulting its routing table for known addresses and address spaces of the SNOWNET, the EP node assigns unused addresses and address spaces to the new node and sends these assignments back to the requesting node.

Because of the distributed nature of the problem, the above address assignment may still conflict with other nodes within the SNOWNET. This is either because of the imperfect knowledge of the EP node about address usage in the whole network or because there are other new nodes at a distant portion of the same SNOWNET requesting addresses from a different EP node at the same time. If such a conflict does occur and is detected later, it is resolved based on the identifier of the nodes involved. The SNOWNET node with lower node identifier is able to keep its addresses and the other party needs to relinquish its addresses and go through the address request and selection procedure again.

A second method of SNOWNET IP address management of the present invention is also described here. This is a centralized approach where one SNOWNET node is configured as an IP address management server, which manages an IP address pool for the whole SNOWNET in the same fashion as a standard DHCP server. When a new SNOWNET node requests IP addresses for its backbone interface and service interfaces, it sends its request to its EP node. The EP then forwards the request to the IP address management server. The server them replies with address assignment. The address assignments are received by the EP node and forwarded to the new SNOWNET node. The reason for the address request and response messages to go through the EP node is that at the time of IP address requesting, the new SNOWNET node has not participated in SNOWNET forwarding algorithm execution, thus it does not have a route to the IP address management server.

Due to the shortage of IP addresses, a common practice is for an administrator to use "private addresses" for computers within the network under his management and apply Network Address Translation (NAT) at gateway nodes.

The SNOWNET addressing schemes introduced above works with both private addresses and public addresses so the administrator of the SNOWNET may select either method, depending on how many IP addresses are available to allocate for the SNOWNET. If private addresses are used for the SNOWNET, the gateway SNOWNET nodes can be configured to provide NAT functionality.

Data Forwarding

SNOWNET 300 data forwarding, including bridging and routing, is now disclosed.

SNOWNET 300 provides two separate levels of security by using independent shared WPA key management procedures for the backbone communications and the communications between a SNOWNET node 302 and its mobile clients 310.

Data packets originating from a source client 310 are encrypted using the local encryption key managed by the SNOWNET node 302 serving this client 310. The packet is received on the AP interface and decrypted by the SNOWNET node 302. Then if the packet is to be sent on the backbone 306, the packet is then encrypted again by the SNOWNET node 302 with the encryption key managed by the master authenticator.

SNOWNET nodes 302 may operate in one of two data forwarding modes: bridging mode and routing mode. Each mode is disclosed herein below.

Bridging Mode

Figure 6:
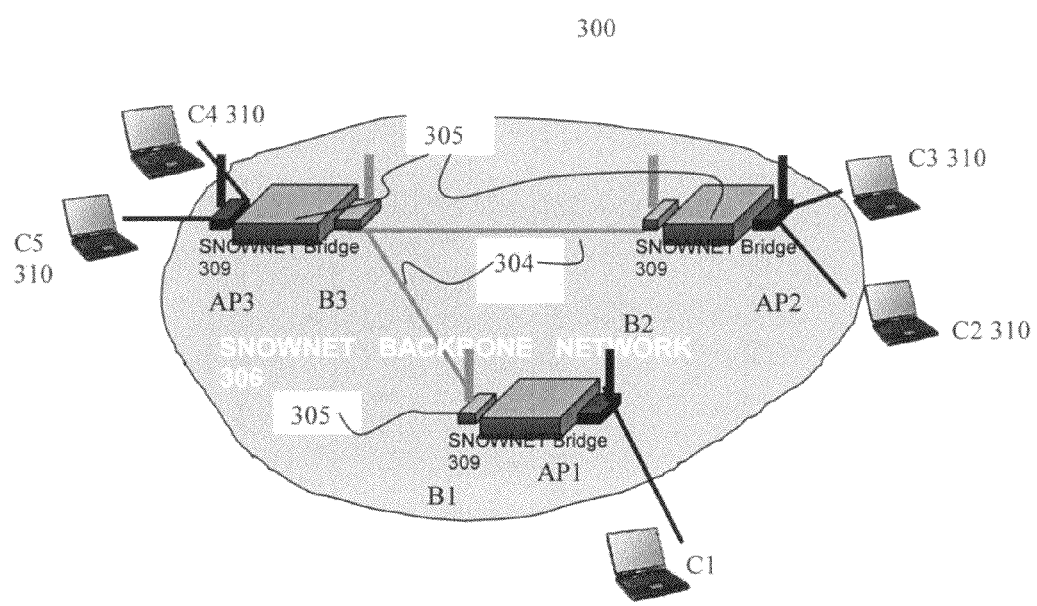
FIG. 6 is a diagram of an example of a SNOWNET spanning tree of the present invention.

When SNOWNET nodes 302 operate in bridging mode, as shown in FIG. 6, the SNOWNET nodes 302 execute the IEEE 802.1d MAC Bridge protocol, discussed herein above. SNOWNET nodes 302 may be referred to as "SNOWNET bridges" 309 when the SNOWNET nodes 302 are operating in bridging mode.

SNOWNET bridges 309 execute a spanning tree protocol to configure their forwarding topology within the backbone network 306. The spanning tree protocol for SNOWNET bridges 309 incorporate the IEEE 802.1d protocol, modified such that SNOWNET Bridge ports are a mix of physical and virtual entities. The local service access network interfaces of SNOWNET bridges are considered as physical ports by SNOWNET bridges 309. On the other hand, backbone "ports" are virtual and there is one port assigned for each backbone network link. That is, each virtual port is identified by the pair-wise combination of local backbone interface identity and the backbone interface identity on a neighboring bridge. In an embodiment, the communication between a bridge and all its neighboring bridges may share the same physical interface, as occurs in a broadcast link. All ports, virtual or physical, are identified before SNOWNET nodes 302 start the spanning tree protocol. During normal operation, the status of active ports is monitored constantly by a combination of passive traffic listening and active probing. If the status changes, the reconfiguration operation of the spanning tree protocol is executed.

After SNOWNET bridges 309 form a spanning tree, the SNOWNET bridges 309 enter the learning and forwarding phase. In learning, each bridge 309 remembers through which port each endpoint MAC address can be reached.

FIG. 6 shows an example of a SNOWNET network 300 with a spanning tree created atop of the SNOWNET backbone network 306. The spanning tree includes SNOWNET nodes 302 configured as SNOWNET bridges 309.

As shown in FIG. 6, the SNOWNET backbone network 306 comprises SNOWNET bridges 309 (B1, B2, and B3), which provide local access services (AP1, AP2, and AP3, respectively) for clients 310 (C1 through C5).

FIG. 7 is a table of SNOWNET Bridging Table 400 Contents. Each SNOWNET bridge 309 of FIG. 6 includes a SNOWNET Bridging Table 400 stored in data storage memory 404 as shown in FIG. 7. The table 400 of FIG. 7 illustrates what is stored in each bridge's table after the topology learning phase is complete. Compared to standard MAC bridges as specified by IEEE 802.1d, the difference is that the "port" column in standard MAC bridges is replaced by two columns in SNOWNET bridges 309: local interface and neighboring interface. These two addresses together identify a SNOWNET "bridge port", either logical or physical.

An important requirement for bridge devices is that when they forward data frames, the original source and final destination MAC address must be preserved along the forwarding, no matter how many bridge devices the frames travel. Unfortunately this is not easily supported by the IEEE 802.11 protocol. Normally an IEEE 802.11 frame header only contains three MAC addresses, namely the sender MAC address, the receiver MAC address, and the AP MAC address. Thus when a frame is forwarded over multiple IEEE 802.11 links, it is impossible to preserve both the source and destination MAC addresses within the IEEE 802.11 frame header. Only recently, a frame format with four MAC addresses, which makes the preservation of both source and destination MAC address possible during forwarding over multiple 802.11 links, are supported by IEEE 802.11 devices. Such a format is known as the Wireless Distribution System (WDS) format.

FIG. 8 shows the IEEE 802.11 Data Frame Address Field contents and possible values of the "To DS" and "From DS" fields 700. The IEEE 802.11 standard refers to the backbone network connecting the APs 104 as a "Distribution System (DS)". In each data frame, there are two bits, namely the "To DS" bit and "From DS" bit. Together they describe the transmission direction of the data frame and the operation mode of the protocol. For instance when a data frame is sent from an access point (AP), such as AP1 in FIG. 6, to a client, such as C1 in FIG. 6, the "To DS" bit is set to FALSE while the "From DS" bit is set to TRUE. When a SNOWNET is operating in bridge mode, it uses the frame format specified by the $4^{th}$ row of 700, or the WDS format, for forwarding data over the backbone. Such a data frame is identified if both the "To DS" and "From DS" fields of the data frame are set to 1.

A SNOWNET bridge 309 will always forward data frames for clients C attached to its local access service. For example, SNOWNET bridge B2 will forward data frames for clients C2 and C3. If both the source (for example, C2) and destination (for example, C3) of a data frame are using its local network access service AP2, the data frame is forwarded directly over the local access interface AP2. When data frames are originated from a mobile client C, their address fields are set as specified by the 802.11 protocol standard. Its "To DS" field is set to 1 while the "From DS" field is set to 0. The first address is the BSSID of the access point to which the mobile client C attaches, which in SNOWNET 300 is provided by the local service access interface of the SNOWNET bridge. The second field contains the mobile client's own address while the third address is the address for the destination client C. The fourth address is left unused. The SNOWNET network 300 of the present invention uses this format for client C to SNOWNET bridge 309 communications. Similarly, a SNOWNET bridge 309 of the present invention uses the standard AP to client C format (To DS=0, From DS=1) to deliver frames to its attached clients C, again leaving the fourth address unused.

After the first SNOWNET bridge 309 (for example B2) receives a data frame from one of its clients (C3) that is destined for a device (such as client C1) not attached to the bridge B2, the SNOWNET bridge B2 reformats the frame to be forwarded through the backbone network 306 it uses the WDS format by setting both "to DS" and "from DS" fields to 1, with the destination and source fields set to the MAC addresses of the destination and source clients. The transmitter address is set to its own backbone interface address and the receiver address is set to the backbone interface address of the next hop SNOWNET node towards the destination. Which SNOWNET node is the next node towards a particular destination can be found out from the Bridging table 400.

Upon receiving a data frame forwarded by a SNOWNET bridge (for example, B2), a SNOWNET bridge (for example B3) decides if it will further forward the frame by using a mechanism similar to the filter mechanism of IEEE 802.1d. A SNOWNET bridge B3 will only forward a data frame when the previous forwarder (the SNOWNET bridge from which the bridge received the data frame, as identified by the transmitter address field in the WDS data frame 700, such as B2) is listed as an active neighbor bridge and the destination and the source of the data frame are on different sides of the bridge as indicated by the bridging table 400 (i.e., the destination and the source are listed as reachable via different ports). Before the data frame is forwarded, the bridge updates the transmitter address in the data frame to the address of its own transmitting (backbone) interface and the receiver address to the next SNOWNET bridge's backbone interface address.

Thus when the frame is forwarded within the backbone, each SNOWNET node participating in the forwarding modifies the transmitter and receiver addresses accordingly and keeps the source and destination address unchanged. The source and destination addresses are also used in updating the Bridging tables 400 on SNOWNET nodes in the same way the standard IEEE 802.1d learning procedure updates bridge tables.

At the bridge B3 that provides access services to the destination client C5, the data frame is converted again to the "from DS" type of data frame in the appropriate format and sent to the destination client C5.

An advantage of running SNOWNET 300 in bridge mode is to simplify network layer roaming and Internetwork Protocol (IP) address management. Since an entire SNOWNET 300 typically shares the same IP address space, there is no need for each SNOWNET bridge 309 to manage client IP addresses. One dedicated DHCP server within the SNOWNET 300 can serve the whole network 300. When a client C moves from one AP coverage area to another, there is no need to change its IP address. Other advantages of this situation include the simplified support of multicast and other link layer management protocols.

Since the Bridging Table 400 (shown in FIG. 7) corresponds to a per-host routing table, such a method may not scale well when the size of the SNOWNET network 300 grows. In addition, a spanning tree forwarding topology limits the shape and efficiency of data forwarding paths. In some cases the shortest forwarding path between two communicating clients cannot be used because their links are not part of the spanning tree. This is frequently the case in broadcast environments. Finally, bridges 309 update their address databases 400 and spanning tree by periodically exchanging "heartbeat" messages. Thus, when the backbone 306 topology changes or a client C changes its attached AP, it may take a relatively long period of time for the network to converge to a new state that reflects the new topology and attachments. Data packets may be lost during this transient period. In the worst case, the updates may not be able to catch up with the changes in the topology and the network becomes unstable.

In summary, the SNOWNET bridge mode is relatively simple, but it is best suited for small and moderately dynamic SNOWNETs 300.

The use of SNOWNET 300 in routing mode, however, overcomes the above-mentioned problems of Bridging mode.

Routing Mode

As shown in FIG. 2, SNOWNET routing includes link state routing for the multi-hop backbone network 306 in which a node 302 periodically detects it neighbors and updates its known topology with new neighbor information. The node 302 then sends out its updated topology to its neighbors 302. After receiving a new topology from a neighbor, the node 302 updates its known topology with the new information. Every time the topology is updated, the routing algorithm computes new routes and makes corresponding changes to the routing table if necessary. In a SNOWNET topology, each SNOWNET node 302 is identified by its IP address and IP subnet mask. Each subnet attached to a SNOWNET node 302's access service interface is represented in the topology as a subnet node. The SNOWNET node 302 connected to the subnet includes the subnet node 302 in the routing information exchange. The Internet 316 is represented as "0" subnet. A SNOWNET node 302 also includes the identities of any foreign clients, which are clients with IP address outside of the SNOWNET node 302's service IP address space as a result of the clients roaming off the service areas of their original SNOWNET service nodes, under its service in the routing information exchange. The overall topology includes SNOWNET nodes 302, subnet nodes, foreign client nodes, and the Internet node 316. A Dijkstra shortest path (fewest hops) algorithm for route computation is used, and a longest match rule for route selection is used.

When SNOWNET nodes 302 operate in the routing mode, the SNOWNET nodes 302 form a flat routing space over the backbone network 306 (as opposed to hierarchical or clustered approaches). These SNOWNET nodes 302 are referred to as SNOWNET routers when operating in routing mode. In this case, the backbone network 306 is viewed as a variation of a Mobile Ad hoc Network (MANET) (IETF Mobile Ad-hoc Networks (manet) Working Group and research results on MANET routing algorithms can be borrowed for SNOW-NET routing (C. Perkins, E. Belding-Royer, and S. Das, "Ad hoc On-Demand Distance Vector (AODV) Routing", IETF Internet Draft, Work in Progress, June 2002; D. Johnson, D. Maltz, Y. Hu, and J. Jetcheva, "The Dynamic Source Routing Protocol for Mobile Ad Hoc Networks (DSR)", IETF Internet Draft, Work in Progress, February 2002; etc.).

However, SNOWNET 300 represents an important special case within the class of MANETs. In SNOWNET 300 there are two distinct types of entities in the network that can be mobile: clients 310 and SNOWNET nodes 302. However, current MANET research treats the whole MANET as a flat routing space in which there is no structure in the MANET topology and each client is a node that participates equally in data forwarding. This typically imposes special requirements to enable MANET functionality on all nodes in the network. In the SNOWNET service model 300, the special requirements on mobile clients 310 are limited so that users may employ standard typical mobile computers such as Laptops, PDAs and other commercially available devices with standard client communication devices such as widely available 802.11b PCMCIA cards. Thus, directly applying an existing MANET approach by configuring both clients and SNOW-NET nodes 302 as MANET nodes is not a viable solution.

With SNOWNET routers 302, a hybrid approach is used. In this approach, only the SNOWNET routers 302 are configured as MANET nodes and participate in MANET-like routing algorithms. All router backbone interfaces share the same IP address space and execute the routing protocols and exchange routing information among themselves. Eventually they together build routes for reaching any backbone nodes.

Among the differences in SNOWNET routing and MANET routing is that each SNOWNET router 302 is also allocated mask-able address space segments from which addresses are dynamically assigned to this router's local clients. DHCP server software is installed on each router to allocate IP addresses for local mobile clients. During routing information exchanges, in addition to advertising for their own IP addresses, backbone nodes also advertise for their local service subnets. In other words, the backbone nodes proxy for their local service subnets by including this information in their reachable network list. This special requirement requires modifications to a "normal" MANET routing protocol specification by requiring an additional field in the SNOWNET routing protocol messages to include these proxy subnets. This field may include multiple entries and hence is referred to as the "proxy list".

In order to support roaming, in addition to the local service subnets, each SNOWNET router 302 is responsible for providing a proxy service for a number of "foreign mobile clients", which are mobile clients 310 currently attached to the router but with addresses outside of the router's address spaces. The advertisement of these foreign client addresses is included in the SNOWNET routing protocol message in the same way as the local service subnets, as entries in the proxy list.

Each SNOWNET router 302 maintains a Routing Table 500, shown in FIG. 9. The Routing Table 500 specifies the local interface and the neighboring interface to the respective portable network node device that is the next hop-destination in a routing path.

In each routing table 500, there are two types of route entries: subnet routes and host routes. The former are aggregated route entries where each entry describes routes for all the hosts within the corresponding address space, expressed in traditional format as a combination of network address and network mask. The latter are for the routes towards specific mobile nodes 302, either the backbone interface of SNOW-NET nodes or foreign mobile clients. In the example routing table 500, the entries for B1, B2, and B3 are host routes for SNOWNET node backbone interfaces, the entries for C5 are a host route for a foreign client, and the entries for AP1, AP2, and AP3 subnets are subnet routes. A longest match rule (W. Doeringer, G. Karjoth, and M. Nassehi, "Routing on longest-matching prefixes, IEEE/ACM Transactions on Networking (TON), Vol. 4, Issue 1, February, 1996) can be applied during route lookups.

A client C may wander off the service coverage area of one SNOWNET router and move to the coverage area of another SNOWNET router. SNOWNET 300 supports client roaming so that there is no data interruption during the change of client attachment. For stationary computers, IP addresses serve both as identifiers and location indicators. However, when an IP address is assigned to a mobile client 310, these two properties contradict each other when the mobile client changes its attachment. In one embodiment, the IP address should the same so that the integrity of the client identity is maintained. In another embodiment, the client should acquire a new address to reflect its current network access attachment for efficient routing.

The SNOWNET router 302 solves this problem by allowing two types of routes to co-exist. For those clients 310 who stay with their original SNOWNET routers, the subnet routes for their subnets represent their routes. There is no specific route for each individual client of this type. For those clients who have left their original subnet and become "foreign clients" for other routers, each routing table explicitly lists their routes. Because of the support for "foreign mobile client", there is no need for the client to acquire a new IP address in the address space of its current attachment environment while it is still within the SNOWNET 300.

When a mobile client 310 moves to a new subnet, the mobile client 310 informs its previous router 302 about its new attachment by forwarding to its previous router 302 a Routing Update Message 600 (an example of which is shown in FIG. 10).

More particularly, FIG. 10 shows a Routing Update Message 600, also referred to as a notification, in which a mobile client 310 notifies its previous service SNOWNET node 302 about the address of its current service SNOWNET node. The message 600 includes the identities of the three parties involved in the activities, as well as security related information such as a certificate encrypted using the client's private key and the previous service SNOWNET node's public key.

This notification 600 shortens the time period or gap between the time the client breaks off from its previous router and the time its new route is inserted into every routing table in the backbone network. During this time period, data packets destined for this mobile client 310 is delivered towards the client's previous service router 302 and the previous service router 302 is not able to further forward data packets to the mobile client. With the notification, the previous router is able to forward data packets to the new router before all routing tables 500 on involved SNOWNET routers are updated. Such a notification 600 will not totally eliminate the gap, but significantly reduces the duration of the gap to the period from the time the client breaks off from its previous router to the time that the client's Routing Update Message 600 arrives at its previous service router. Since mobile clients 310 typically move between neighboring coverage areas, it is likely that their previous and current service routers 302 are very close in distance (or number of link hops) in the backbone network 306 topology. Thus the notification will arrive relatively quickly. Each router 302 may optionally cache data packets for a client 310 if the data packets cannot be delivered to the clients. Once the notification 600 about the client's new router 302 arrives, cached data packets are forwarded to the new router 302. Also, upon receiving such a notification 600, if the client 310 is a foreign client on its previous router 302, the client 310 is removed from the previous router's "foreign client" list.

A foreign client in SNOWNET 300 is served differently by the network from how a mobile client 310 is served by a foreign agent as specified in the well known Mobile IP (C. Perkins, "IP Mobility Support", IETF RFC 2002, October, 1996). In Mobile IP, when a mobile client is attached to a network other than its home network, the mobile client acquires a local IP address, termed "foreign address", from its current network. The network to which the mobile client currently attaches is known as the "foreign network". The mobile client always maintains its address on its home network. This address is known as the mobile client's home address or permanent address. When other hosts on the Internet want to communicate with the mobile client, they will address their communications using the mobile client's home address. When the mobile client is on a foreign network, it receives incoming traffic with the help of an entity on its home network, its home agent. Incoming traffic is sent to the mobile client's home network by the Internet. Then the home agent captures the packets for the mobile client and forwards them to the mobile client's current location using its new local address. For this scheme to work, the mobile client is required to report its local address on a foreign network to its home agent. By using two addresses (home address and foreign address) simultaneously, the Mobile IP solves the conflict between the attachment and identity purposes of addressing.

In SNOWNET 300 of the present invention, there is no need for a mobile client 310 to receive a new IP address. When the mobile client enters SNOWNET 300 for the first time, the mobile client receives an IP address from the SNOWNET node 302 it is associated with. Because the network 300 is capable of forwarding data for specific hosts, it is not necessary for a mobile client to obtain new foreign address when it moves to the coverage area of a SNOWNET node 302 that is different from its initial node. The network 300 propagates routes for the mobile client reflecting its current attachment. SNOWNET 300 has such a capability because it operates on a scale that is much smaller than the Mobile IP's environment. Thus SNOWNET 300 can install per-host routes in the network for these mobile clients. On the other hand, SNOWNET 300 can easily support Mobile IP as well. A Mobile IP-capable mobile client may simply report its SNOWNET address to its home agent as its foreign address. This results in more efficient operation of Mobile IP in a SNOWNET 300 environment.

As disclosed herein above, SNOWNET comprises a mobile network solution which provides secure and portable wireless networking service to mobile users with devices equipped with wireless network interfaces. The Secure Nomadic Wireless Network, or SNOWNET, follows a hierarchical approach. Special SNOWNET nodes are deployed in the area where networking service is needed and form a backbone network. At the same time, SNOWNET nodes provide local access service to regular mobile clients.

The SNOWNET of the present invention is portable and can be rapidly deployed in an environment where there is no existing networking infrastructure. SNOWNET is secure. Using SNOWNET extensions to the WPA algorithm, all traffic transmitted within SNOWNET is highly protected. SNOWNET also provides an enhanced scheme for transferring authentication and security during handoff to support smooth, rapid mobile client roaming. Finally, SNOWNET offers two operation modes for automatically forwarding messages and that provide seamless roaming between different local service cells.

SNOWNET can be used in several different scenarios. Here are some examples. SNOWNET can be setup as a secure fast-deployable standalone networking infrastructure to provide instant networking services to a field where there is no trusted networking environment. Typical usages may include battle field situations, disaster relief operations, scientific exploration tasks, and robotics applications. SNOWNET can be installed as a cost-efficient multi-hop wireless LAN to provide wireless networking coverage for any organization or in any home. With a flexible, multi-hop, self-organized, and self configured wireless backbone, SNOWNET saves customers costs for cabling, installation and maintenance. SNOWNET may also be used as a stub network to connect isolated LANs to an organizational network. For instance, a school may use SNOWNET to "glue" a LAN installed in a remote building to its existing campus network.

Features of the present invention described above include:

The SNOWNET architecture for a 2-level secure, portable wireless router network device with security based on extensions to the WPA WLAN security.

The extended WPA security algorithm for securely adding and authenticating a router to an existing SNOWNET.

A self-configured address management scheme for SNOWNET to allocate addresses for their backbone interfaces and local service networks.

A bridging protocol involving adaptation of with the IEEE 802.1d and 802.1w bridging standards for multi-hop IEEE 802.11 networks.

A new routing algorithm that is a hybrid approach based on traditional MANET routing algorithms.

Support for efficient network level roaming for mobile clients between difference service areas of the SNOWNET.

Support for an enhanced mechanism for efficient handoff of authentication and security when mobile client is roaming between difference service areas of the SNOWNET.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A wireless computer network, wherein a wireless backbone network which includes a plurality of wireless network node devices the wireless computer network comprising:
   at least one wireless network node device configured to provide wireless local access service to mobile client computer devices in corresponding coverage areas, operate as proxy authentication nodes, and forward and deliver communication data of mobile client computer devices in a multihop fashion the wireless computer network;
   at least one first new wireless network node device which newly joins as part of said wireless backbone network enabled to act as a supplicant to request authentication from said wireless backbone network prior to becoming part of said wireless backbone network; and
   a wireless network node device among any of the wireless network node devices configured to authenticate the at least one first new wireless network node device by operating as a proxy authentication node and communicate with the at least one wireless network node device operating as a master authentication node;
   where said at least one first new wireless network node device initiates a wireless local access service within a corresponding of the coverage areas using a key for joining said wireless backbone network provided after completion of authentication, and
   said at least one first new wireless network node device operates as the proxy authentication node to authenticate other second new wireless network node devices to said wireless backbone network in accordance with a topology of the wireless computer network updated through communication among the wireless network node devices after completion of the authentication of said at least one first new wireless network node device which newly joins as part of said wireless backbone network.

2. The wireless computer network as described in claim 1, characterized in that said wireless network node device which operates as said master authentication node includes a means which, upon authenticating a newly joining wireless network node device, forwards a key for protecting communication on said wireless backbone network to said newly joining wireless network node device.

3. The wireless computer network as described in claim 2, characterized in that said wireless network node device which operates as said master authentication node is enabled to renew the key for protecting communication on said wireless backbone network when a given wireless network node device leaves said wireless backbone network.

4. The wireless computer network as described in claim 1, characterized in that said wireless network node device which operates as said master authentication node enables periodic generation of a new key and distributes the new key to the wireless network node devices making up said wireless backbone network.

5. The wireless computer network as described in claim 1, characterized in that at least one of said wireless network node devices provides gateway service and includes a plurality of interfaces, wherein one of the plurality of interfaces possessed by each gateway service node device provides communications with said wireless backbone network, and at least one of the plurality of interfaces provides communication with another network that communicates with said wireless computer network.

6. A method of a wireless computer network for providing a wireless backbone network which includes a plurality of wireless network node devices, the method comprising:
   providing at least one wireless network node devices configured to provide wireless local access service to mobile client computer devices in corresponding coverage areas, operate as proxy authentication nodes, and forward and deliver communication data of mobile client computer devices in a multihop fashion the wireless computer network;
   enabling at least one first new wireless network node devices which newly joins as part of said wireless backbone network to act as a supplicant to request authentication from said wireless backbone network prior to becoming part of said wireless backbone network;
   causing a wireless network node device among any of the wireless network devices configured to authenticate the at least one first new wireless network node device by operating as a proxy authentication node and communicate with the at least one wireless network node device operating as a master authentication node;
   initiating, via said at least one first new wireless network node device, a wireless local access service within a corresponding of the coverage areas using a key for joining said wireless backbone network provided after completion of authentication, and
   operating the at least one first new wireless network node device as a proxy authentication node to authenticate other second new wireless devices to said wireless backbone network in accordance with a topology of the wireless computer network updated through communication among the wireless network node devices after completion of the authentication of said at least one first new wireless network node device which newly joins as part of said wireless backbone network.

7. The method as described in claim 6, wherein said wireless network node device which operates as said master authentication node, upon authenticating a newly joining wireless network node device, forwards a key for protecting communication on said wireless backbone network to said newly joining wireless network node device.

8. The method as described in claim 7, wherein said wireless network node device which operates as said master authentication node renews the key for protecting communication on said wireless backbone network when a given wireless network node device leaves said wireless backbone network.

9. The method as described in claim 6, wherein said wireless network node device which operates as said master authentication node periodically generates a new key and distributes it to the wireless network node devices making up said wireless backbone network.

10. A method of a wireless computer network including a wireless backbone network, comprising:
   authenticating a first new wireless network node device based on receipt of a request from the first new wireless network node device prior to said authenticating;
   providing, by the first new wireless network node device, a wireless local access service to a client computer device within a coverage area; and
   causing the first new wireless network node device among any of the wireless network node devices to authenticate at least one second new wireless network node device by operating as a proxy authentication node for authentication requests from second new wireless network node devices joining the wireless backbone network subsequent to said authenticating, and where the first new wireless network node device operates as the proxy authentication node using in accordance with a topology of the wireless computer network updated through communication among the wireless network node devices after completion of the authenticating of the first new wireless network node device which newly joins as part of said wireless backbone network.

\* \* \* \* \*

UNITED STATES PATENT AND TRADEMARK OFFICE
CERTIFICATE OF CORRECTION

PATENT NO. : 8,630,275 B2  
APPLICATION NO. : 12/929662  
DATED : January 14, 2014  
INVENTOR(S) : Ji et al.

Page 1 of 1

It is certified that error appears in the above-identified patent and that said Letters Patent is hereby corrected as shown below:

On the Title Page Item [60] (Related U.S. Application Data), Line 3, delete "Nov. 25, 2002." and insert -- Nov. 25, 2002, provisional application No. 10/463,857, filed on Jun. 18, 2003. --, therefor.

In the Specification

Column 1, Line 10, after "from" delete "to".

In the Claims

Column 31, Line 5, in Claim 10, after "node" delete "using".

Signed and Sealed this  
Twenty-second Day of July, 2014

Michelle K. Lee  
*Deputy Director of the United States Patent and Trademark Office*